United States Patent
Chang et al.

(10) Patent No.: US 8,270,316 B1
(45) Date of Patent: Sep. 18, 2012

(54) ON-CHIP RADIO FREQUENCY (RF) INTERCONNECTS FOR NETWORK-ON-CHIP DESIGNS

(75) Inventors: Mau-Chung F. Chang, Los Angeles, CA (US); Jason Cong, Pacific Palisades, CA (US); Adam Kaplan, Van Nuys, CA (US); Mishali Naik, Long Beach, CA (US); Glenn Reinman, Los Angeles, CA (US); Eran Socher, Los Angeles, CA (US); Sai-Wang Tam, Rosemead, CA (US); Chunyue Liu, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 313 days.

(21) Appl. No.: 12/363,182

(22) Filed: Jan. 30, 2009

(51) Int. Cl.
*H04L 12/28* (2006.01)

(52) U.S. Cl. ........ 370/254; 370/352; 370/389; 370/392; 370/410; 710/52; 710/61; 710/116; 710/243

(58) Field of Classification Search .................. 370/254, 370/352, 389, 392, 410; 710/52, 61, 116, 710/123, 243
See application file for complete search history.

(56) References Cited

U.S. PATENT DOCUMENTS

| | | | | |
|---|---|---|---|---|
| 4,274,112 A | * | 6/1981 | Leysieffer et al. | 348/705 |
| 5,072,379 A | * | 12/1991 | Eberhardt | 705/7.26 |
| 5,892,923 A | * | 4/1999 | Yasuda et al. | 709/239 |
| 5,898,909 A | * | 4/1999 | Yoshihara et al. | 455/73 |
| 6,013,949 A | * | 1/2000 | Tuttle | 257/723 |
| 6,493,318 B1 | * | 12/2002 | Bare | 370/238 |
| 6,651,225 B1 | * | 11/2003 | Lin et al. | 716/113 |
| 7,355,980 B2 | * | 4/2008 | Bauer et al. | 370/238 |
| 7,397,794 B1 | * | 7/2008 | Lacroute et al. | 370/367 |
| 7,522,538 B2 | * | 4/2009 | Rhim et al. | 370/254 |
| 7,546,089 B2 | * | 6/2009 | Bellantoni | 455/73 |
| 7,826,460 B2 | * | 11/2010 | Lee | 370/395.62 |
| 7,873,774 B2 | * | 1/2011 | Orishko et al. | 710/313 |
| 2003/0085836 A1 | * | 5/2003 | Mikami et al. | 342/175 |
| 2004/0080285 A1 | * | 4/2004 | Victor et al. | 315/365 |
| 2005/0075080 A1 | * | 4/2005 | Zhang | 455/73 |
| 2005/0176380 A1 | * | 8/2005 | Okabe et al. | 455/73 |
| 2006/0135084 A1 | * | 6/2006 | Lee | 455/78 |

(Continued)

OTHER PUBLICATIONS

Abad, Pablo et al., "Rotary Router; An Efficient Architecture for CMP Interconnection Networks," Proceedings of ISCA-34, Jun. 2007, pp. 116-125, ACM.

(Continued)

*Primary Examiner* — Ayaz Sheikh
*Assistant Examiner* — Andrew C Lee
(74) *Attorney, Agent, or Firm* — Withrow & Terranova, P.L.L.C.

(57) ABSTRACT

An on-chip Radio Frequency (RF) Interconnect (RF-I) for communication between internal circuit nodes of an integrated circuit is provided. In one embodiment, an integrated circuit is provided that includes an on-chip transmission line, a first circuit node associated with an RF transmitter connected to the transmission line, and a second circuit node associated with an RF receiver connected to the transmission line. In order to transmit data from the first circuit node to the second circuit node, the RF transmitter associated with the first circuit node modulates the data onto an RF carrier frequency to provide a modulated RF signal and transmits the modulated RF signal over the transmission line. The RF receiver associated with the second circuit node receives the modulated RF signal from the transmission line and demodulates the modulated RF signal to recover the data for the second circuit node.

34 Claims, 15 Drawing Sheets

U.S. PATENT DOCUMENTS

| | | | | |
|---|---|---|---|---|
| 2006/0161875 | A1* | 7/2006 | Rhee | 716/14 |
| 2006/0186973 | A1* | 8/2006 | Satou | 333/260 |
| 2006/0256964 | A1* | 11/2006 | Gu et al. | 380/242 |
| 2007/0115939 | A1* | 5/2007 | Lee et al. | 370/352 |
| 2008/0005402 | A1* | 1/2008 | Kim et al. | 710/52 |
| 2008/0084893 | A1* | 4/2008 | Lee | 370/410 |
| 2008/0117117 | A1* | 5/2008 | Washiro | 343/850 |
| 2008/0174384 | A1* | 7/2008 | Petrovic et al. | 333/101 |
| 2008/0183927 | A1* | 7/2008 | Rofougaran | 710/106 |
| 2008/0215786 | A1* | 9/2008 | Goossens et al. | 710/243 |
| 2008/0299921 | A1* | 12/2008 | Liao | 455/115.3 |
| 2009/0016340 | A1* | 1/2009 | Eberle | 370/389 |
| 2009/0049212 | A1* | 2/2009 | Mangano et al. | 710/61 |
| 2009/0072856 | A1* | 3/2009 | Subramaniam et al. | 326/38 |
| 2009/0201925 | A1* | 8/2009 | Rhim et al. | 370/389 |
| 2009/0245257 | A1* | 10/2009 | Comparan et al. | 370/392 |
| 2009/0247179 | A1* | 10/2009 | Bell et al. | 455/452.1 |
| 2009/0313592 | A1* | 12/2009 | Murali et al. | 716/6 |
| 2009/0322377 | A1* | 12/2009 | Eberle et al. | 326/101 |
| 2010/0019827 | A1* | 1/2010 | Tamura et al. | 327/403 |
| 2010/0158005 | A1* | 6/2010 | Mukhopadhyay et al. | 370/392 |
| 2010/0191911 | A1* | 7/2010 | Heddes et al. | 711/118 |
| 2011/0026541 | A1* | 2/2011 | Beshai | 370/422 |

OTHER PUBLICATIONS

Beckmann, Bradford M. et al., "TLC: Transmission Line Caches," Proceedings of the 36th International Symposium on Microarchitecture-36, 2003, IEEE.

Benini, Luca et al., "Networks on Chips: A New SoC Paradigm," IEEE Computer, Jan. 2002, pp. 70-78, vol. 35, No. 1, IEEE.

Chang, Mau-Chung Frank et al., "Advanced RF/Baseband Interconnect Schemes for Inter- and Intra-ULSI Communications," IEEE Transactions on Electron Devices, Jul. 2005, pp. 1271-1285, vol. 52, No. 7, IEEE.

Chang, M. Frank et al., "CMP Network-on-Chip Overlaid with Multi-Band RF-Interconnect," Proceedings of HPCA-14, Feb. 2008.

Chang, Mau-Chung Frank et al., "RF/Wireless Interconnect for Inter- and Intra-Chip Communications," Proceedings of the IEEE, Apr. 2001, vol. 89, No. 4, IEEE.

Cheng, Liqun et al., "Interconnect-Aware Coherence Protocols for Chip Multiprocessors," Proceedings of the 33rd International Symposium on Computer Architecture-33, 2006, IEEE.

Cong, Jason, "An Interconnect-Centric Design Flow for Nanometer Technologies," Proceedings of the IEEE, Apr. 2001, pp. 505-528, vol. 89, No. 4, IEEE.

Cong, Jason et al., "Interconnect Performance Estimation Models for Design Planning," IEEE Transactions on Computer-Aided Design of Integrated Circuits and Systems, Jun. 2001, pp. 729-752, vol. 20, No. 6, IEEE.

Dhodapkar, Ashutosh S. et al., "Comparing Program Phase Detection Techniques," 36th Annual International Symposium on Microarchitecture, Dec. 2003.

Gindin, Roman et al., "NoC-Based FPGA: Architecture and Routing," First International Symposium on Networks-on-Chips, May 2007.

Gu, Qun et al., "Two 10Gb/s/pin Low-Power Interconnect Methods for 3D ICs," ISSCC, 2007, Session 24, Multi-GB/s Transceivers, pp. 448-449 and 614, IEEE.

Hamerly, Greg et al., "SimPoint 3.0: Faster and More Flexible Program Analysis," Workshop on Modeling, Benchmarking and Simulation, Jun. 2005.

Ho, Ron et al., "The Future of Wires," Proceedings of the IEEE, Apr. 2001, pp. 490-504, vol. 89, No. 4, IEEE.

Hu, Yuanfang et al., "Communication Latency Aware Low Power NoC Synthesis," DAC '06: Proceedings of the 43rd Annual Conference on Design Automation, 2006, pp. 574-579, ACM.

Huang, Daquan et al., "324GHz CMOS Frequency Generator Using Linear Superposition Technique," ISSCC 2008, Session 26, Wireless Frequency Generation, 2008, pp. 476-477 and 629, IEEE.

Huang, Daquan et al., "A 60GHz CMOS VCO Using On-Chip Resonator with Embedded Artificial Dielectric for Size, Loss, and Noise Reduction," ISSCC 2006, Session 17, RFID and RF Directions, 2006, IEEE.

Isci, Canturk et al., "Identifying Program Power Phase Behavior Using Power Vectors," Workshop on Workload Characterization, Sep. 2003.

Jin, Yuho et al., "A Domain-Specific On-Chip Network Design for Large Scale Cache Systems," Proceedings of HPCA-13, Feb. 2007, pp. 318-327, IEEE.

Karnik, Tanay et al, "Sub-90nm Technologies—Challenges and Opportunities for CAD," Proceedings of International Conference on Computer Aided Design, Nov. 2002, pp. 203-206, IEEE.

Kim, John et al., "Flattened Butterfly: A Cost-Efficient Topology for High-Radix Networks," Proceedings of ISCA-34, Jun. 2007, ACM.

Kim, Jongman et al., "A Novel Dimensionally-Decomposed Router for On-Chip Communication in 3D Architectures," Proceedings of ISCA-34, Jun. 2007, pp. 138-149, ACM.

Kirman, Nevin et al., "Leveraging Optical Technology in Future Bus-based Chip Multiprocessors," Proceedings of MICRO-39, Dec. 2006, IEEE.

Ko, Jenwei et al., "An RF/Baseband FDMA-Interconnect Transceiver for Reconfigurable Multiple Access Chip-to-Chip Communication," ISSCC 2005, Session 18, High-Speed Interconnects and Building Blocks, 2005, pp. 338-339 and 602, IEEE.

Kumar, Rakesh et al, "Interconnections in Multi-core Architectures: Understanding Mechanisms, Overheads and Scaling," Proceedings of the 32nd International Symposium on Computer Architecture, Jun. 2005.

Li, Man-Lap et al., "The ALPBench Benchmark Suite for Complex Multimedia Applications," Proceedings of the 2005 International Symposium on Workload Characterization (IISWC '05), Oct. 2005.

Nicopoulos, Chrysostomos A. et al., "ViChaR: A Dynamic Virtual Channel Regulator for Network-on-Chip Routers," The 39th Annual IEEE/ACM International Symposium on Microarchitecture-39, Dec. 2006, IEEE.

Ogras, Umit Y. et al., "It's a Small World After All: NoC Performance Optimization Via Long-Range Link Insertion," IEEE Transactions on Very Large Scale Integration (VLSI) Systems, Jul. 2006, pp. 693-706, vol. 14, No. 7, IEEE.

Owens, John D. et al., "Research Challenges for On-Chip Interconnection Networks," IEEE Micro, 2007, pp. 96-108, vol. 27, No. 5, IEEE.

Pinto, Alessandro et al., "Constraint-Driven Communication Synthesis," Design Automation Conference, Jun. 2002, ACM.

Renau, Joe et al., "SESC: Super Escalar Simulator," http://sesc.sourceforge.net, Mar. 2002.

Socher, Eran et al, "Can RF Help CMOS Processors?" Invited Paper, IEEE Communication Magazine, 2007, pp. 104-111, vol. 45, No. 8, IEEE.

Tam, Sai-Wang et al., "Simultaneous Sub-harmonic Injection-Locked mm-Wave Frequency Generators for Multi-band Communications in CMOS," 2008 IEEE Radio Frequency Integrated Circuits Symposium, 2008, pp. 131-134, IEEE.

Wang, Hang-Sheng et al., "Orion: A Power-Performance Simulator for Interconnection Networks," Proceedings of MICRO-35, Nov. 2002.

Wenisch, Thomas F. et al., "SimFlex: Statistical Sampling of Computer System Simulation," IEEE Micro, Jul./Aug. 2006, pp. 2-15, vol. 26, No. 4, IEEE.

Woo, Steven Cameron et al., "The SPLASH-2 Programs: Characterization and Methodological Considerations," Proceedings of ISCA-22, Jun. 1995, pp. 24-36.

* cited by examiner

LEGEND
⋯ ROUTERS FOR PROCESSOR CORES
╌ ROUTERS FOR CACHE BANKS
☐ ROUTERS FOR EXTERNAL MEMORY INTERFACES

LEGEND
☐ ROUTERS FOR PROCESSOR CORES
⌐ ⌐ ROUTERS FOR CACHE BANKS
☐ ROUTERS FOR EXTERNAL MEMORY INTERFACES

LEGEND
☐ ROUTERS FOR PROCESSOR CORES
☐ ROUTERS FOR CACHE BANKS
☐ ROUTERS FOR EXTERNAL MEMORY INTERFACES

ON-CHIP RADIO FREQUENCY (RF) INTERCONNECTS FOR NETWORK-ON-CHIP DESIGNS

This invention was made with government support under HR0011-07-3-0002 awarded by DARPA. The Government may have certain rights in this invention.

FIELD OF THE DISCLOSURE

The present invention relates to on-chip Radio Frequency (RF) interconnects.

BACKGROUND

For several decades, a scaling trend in Complementary Metal-Oxide-Semiconductor (CMOS) technology has been driven by a desire for higher performance and lower cost integrated circuits. Scaling of CMOS devices has decreased digital gate capacitive loads, thereby reducing gate latency, and has also reduced the silicon area of the digital gates, which in turn has enabled the integration of more logic in the same chip area. The lower latency and parallelization resulting from the increased amount of logic in the same chip area has contributed to increased microprocessor performance in terms of instructions performed per second.

Two physical facts present significant challenges to continued performance improvement via simple device scaling. One is dissipated power. As clock frequency increases, more power is consumed up to a point where serious thermal and reliability issues can occur. Increased leakage, as a result of scaling, further cuts into the power budget, thus limiting the increase of frequency even more. The second physical fact is the scaling effect on the properties of metal wires that serve as device and unit interconnects. Previously regarded negligible, wire contribution to latency and power consumption has become significant with scaling due to increased resistance and more significant capacitance compared with Metal-Oxide Semiconductor (MOS) devices. While local wires still scale nicely since their lengths get shorter as devices are scaled, global wires used for communication across the chip are a potential inhibition to improving microprocessor performance.

One current approach for providing improved microprocessor performance with tolerable power consumption is chip multi-processors (CMPs). Under this approach, scaling is used to reduce the area of processor cores while keeping the clock operation frequency relatively constant. Integrating more cores on the same chip area allows a performance benefit through parallelization. Communication between on-chip cores and shared on-chip caches can be done using a traditional shared bus. However, one issue with this approach is that as the number of cores and cache banks further increase, the shared bus does not easily scale, thereby resulting in more latency for communication, higher power consumption, and increased chip area.

An alternative approach that seems to scale more easily is referred to as Network-on-Chip (NoC). In this approach, on-chip routers are used in conjunction with every on-chip core and cache bank. In a simple mesh topology, each router can communicate with that router's four orthogonal neighbors and with that router's adjacent core or cache. Multi-bit repeated wire based buses are still assumed to connect the NoC routers. As a result, although close neighbors can easily communicate with high bandwidth and low latency in an NoC, communication between distant points across the chip incurs longer latencies. The bottleneck gets even more severe when overall chip communication is considered, where larger traffic increases router congestion and makes actual latencies even longer. Thus, there is a need for a high bandwidth, power efficient technique for on-chip communication.

SUMMARY OF THE DETAILED DESCRIPTION

The present invention relates to an on-chip Radio Frequency (RF) Interconnect (RF-I) for communication between internal circuit nodes of an integrated circuit. In one embodiment, an integrated circuit is provided that includes an on-chip transmission line, a first circuit node associated with an RF transmitter connected to the transmission line, and a second circuit node associated with an RF receiver connected to the transmission line. In order to transmit data from the first circuit node to the second circuit node, the RF transmitter associated with the first circuit node modulates the data onto an RF carrier frequency to provide a modulated RF signal and transmits the modulated RF signal over the transmission line. The RF receiver associated with the second circuit node receives the modulated RF signal from the transmission line and demodulates the modulated RF signal to recover the data for the second circuit node.

In another embodiment, the integrated circuit includes an on-chip transmission line, a first circuit node associated with an RF transmitter connected to the transmission line, and a second circuit node associated with an RF receiver connected to the transmission line. In order to transmit data from the first circuit node to the second circuit node, the RF transmitter associated with the first circuit node modulates multiple data streams onto multiple RF carrier frequencies to provide corresponding modulated RF signals and transmits the modulated RF signals over the transmission line. The RF receiver associated with the second circuit node receives the modulated RF signals and demodulates the modulated RF signals to recover the data for the second circuit node. An aggregate data rate resulting from the use of the multiple RF carrier frequencies is substantially greater than that achieved using a single RF carrier frequency.

In another embodiment, the integrated circuit includes an on-chip transmission line and multiple circuit nodes, each having at least one of an RF transmitter and an RF receiver connected to the transmission line. A Multiple Access (MA) scheme, such as, for example, Frequency Division Multiple Access (FDMA) or Code Division Multiple Access (CDMA), is utilized to enable simultaneous RF interconnects between pairs or groups of the circuit nodes over the transmission line.

In another embodiment, the integrated circuit includes an on-chip transmission line and multiple circuit nodes, each having at least one of an RF transmitter and an RF receiver connected to the transmission line. A multicast from one of the circuit nodes may be provided by first modulating data to be multicast onto an RF carrier frequency to provide a modulated RF signal and then transmitting the modulated RF signal over the transmission line. For each circuit node desiring to receive the multicast, an associated RF receiver receives the modulated RF signal and demodulates the modulated RF signal to recover the data for the circuit node.

In another embodiment, RF interconnects are utilized as either a replacement for global interconnects in a Network-on-Chip (NoC), System-on-Chip (SoC), or the like or used to augment global interconnects in a NoC, SoC, or the like. For instance, in one embodiment, an RF interconnect is utilized as a global bus in a NoC or SoC. As another example, RF interconnects may be overlaid upon a baseline Network-on-Chip (NoC) and utilized as shortcuts in order to improve performance in terms of communication latency and/or power consumption. More specifically, an integrated circuit includes a number of circuit nodes such as, for example, processing cores, cache banks, and external memory interfaces. A network of on-chip routers are associated with the circuit nodes, where the routers are interconnected via on-chip wire buses to provide a baseline NoC. At least some of the routers in the baseline NoC are RF-enabled routers that are also connected to an on-chip transmission line for RF communication between those RF-enabled routers. A number of RF interconnects are statically or dynamically provided between the RF-enabled routers to provide an overlay network of shortcuts between the RF-enabled routers.

Those skilled in the art will appreciate the scope of the present invention and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and the accompanying claims.

Figure 1A:
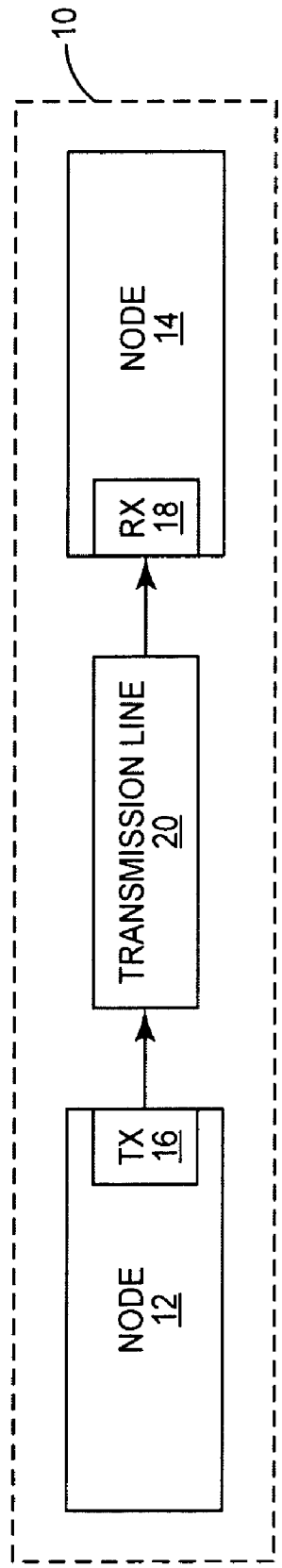
FIGS. 1A and 1B illustrate an integrated circuit including a Radio Frequency (RF) interconnect between on-chip circuit nodes according to one embodiment of the present invention.

The present invention relates to Radio Frequency (RF) Interconnects (RF-Is) for on-chip RF communication between circuit nodes within an integrated circuit. As used herein, an integrated circuit is a monolithic integrated circuit, wherein components of the integrated circuit are fabricated on a single semiconductor die or chip. FIG. 1A illustrates an integrated circuit 10 including two circuit nodes 12 and 14, wherein an RF-I is provided between the two circuit nodes 12 and 14 according to one embodiment of the present invention. The circuit nodes 12 and 14 may be, for example, processing cores of a multiple core processor, caches shared by multiple processing cores in a multiple core processor, external memory interfaces, or the like. More specifically, in this embodiment, the circuit node 12 has an associated RF transmitter 16, and the circuit node 14 has an associated RF receiver 18. The RF transmitter 16 and the RF receiver 18 are both connected to an on-chip transmission line 20 (hereinafter "transmission line 20"). The transmission line 20 may be implemented as, for example, a microstrip, a coplanar waveguide, or a differential transmission line. A microstrip may be implemented in a thick, top metal layer and a ground plane can be either the substrate or a low metal layer. A coplanar waveguide may be implemented as a signal line in a thick, top metal layer and a group plane may be implemented using two lines on each side of the signal line. Lastly, a differential transmission line may be implemented as two substantially identical signal lines located in proximity to one another in top metal layers and used to guide a differential mode excited by a differential signal.

In this embodiment, the RF transmitter 16 is illustrated as a component of the circuit node 12, and the RF receiver 18 is illustrated as a component of the circuit node 14. However, the present invention is not limited thereto. The RF transmitter 16 and the RF receiver 18 may be separate components within the integrated circuit 10. For example, as discussed below, in one embodiment, the RF transmitter 16 and the RF receiver 18 may be associated with separate on-chip routers in a Network-on-Chip (NoC) operating to interconnect multiple circuit nodes, such as the circuit nodes 12 and 14. Also, it should be noted that while the circuit node 12 is illustrated as being associated with only the RF transmitter 16 and the circuit node 14 is illustrated as being associated with only the RF receiver 18, the circuit nodes 12 and 14 may each be associated with both an RF transmitter and an RF receiver.

In order to provide an RF-I between the circuit nodes 12 and 14, the RF transmitter 16 obtains data to be transmitted from the circuit node 12. The RF transmitter 16 modulates the data onto an RF carrier frequency ($f_C$) (FIG. 1B) using an RF modulation scheme to provide a modulated RF signal. The RF modulation scheme may be, for example, Binary Phase Shift Keying (BPSK), Amplitude Shift Keying (ASK), or the like. Note that the preceding list of RF modulation schemes is intended to be exemplary rather than limiting. As will be appreciated by one of ordinary skill in the art, any number of RF modulation schemes may be used for the RF-I. The RF transmitter 16 then transmits the modulated RF signal over the transmission line 20. The RF receiver 18 receives the modulated RF signal transmitted over the transmission line 20 and recovers the data transmitted by the circuit node 12 for the circuit node 14 using a demodulation process (e.g., downconversion, filtering, etc.).

Note that traditional repeated wire buses used for on-chip interconnects have limited speed both in terms of latency and in terms of achievable data rate due to a high resistance-capacitance (RC) product induced by the wires themselves. This RC product limits the speed since signaling over traditional repeated wires is based on charging and discharging of the wire segments to send data. The result is a poor use of a frequency bandwidth of wires in a scaled device, which may be on the order of a few hundred Gigahertz.

In contrast, using an RF-I, transmission of data between the circuit nodes 12 and 14 of the integrated circuit 10 is achieved by modulating an electromagnetic (EM) wave that is guided along the on-chip transmission line 20. Since the EM wave travels at the effective speed of light in dielectric layers of the integrated circuit 10, communication latency is reduced as much as physically possible. Further, an available data rate for communication between the two circuit nodes 12 and 14 also benefits from the RF-I in two ways. First, at baseband, the data rate is limited by the high attenuation of high frequencies as compared with DC due to wire resistance. As higher data rates are desired with scaling, equalizing the loss dispersion from DC to higher frequencies becomes more difficult. Modulating a high frequency, or RF, carrier on the transmission line 20 offers relatively less variation in attenuation even at high modulation rates since the data bandwidth to carrier frequency ratio $\Delta f/f_C$ is much smaller than at baseband. As a result, equalization is simplified, thereby saving power and chip area. Second, in another embodiment discussed below, the RF transmitter 16 may modulate the data from the circuit node 12 onto multiple RF carrier frequencies, or sub-bands, to provide an aggregate data rate that is substantially greater than that achieved using a single RF carrier frequency.

Figure 1B:
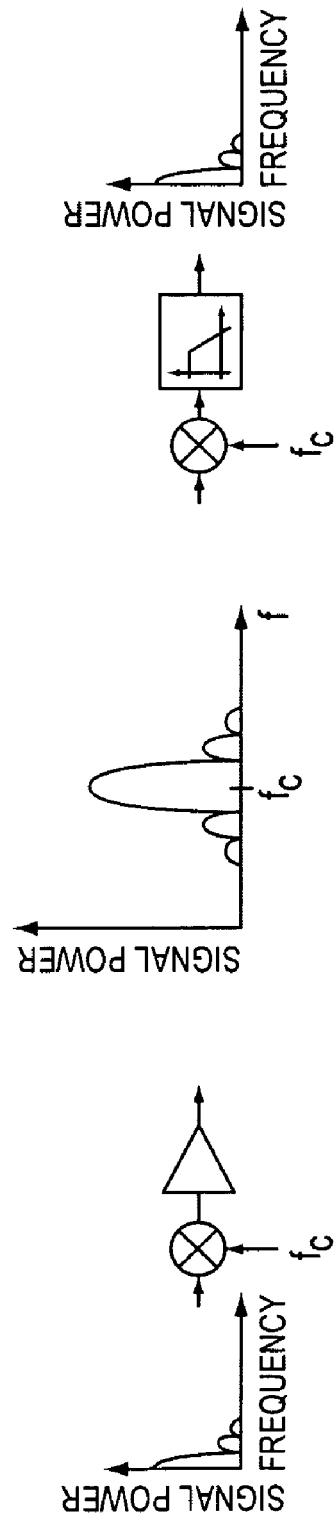

FIG. 1B conceptually illustrates the transmission of data from the circuit node 12 to the circuit node 14 using an RF-I according to one embodiment of the present invention. As discussed above, data from the circuit node 12 is used by the RF transmitter 16 to modulate an RF carrier signal having a frequency ($f_C$) to provide a modulated RF signal. The RF transmitter 16 transmits the modulated RF signal over the transmission line 20. The RF receiver 18 receives the modulated RF signal and performs a demodulation process to recover the transmitted data. In this example, the modulation process is illustrated as upconversion and buffering, and the demodulation process is illustrated as downconversion and low-passing filtering. However, as will be appreciated by one of ordinary skill in the art, the modulation process and the demodulation process will vary depending on the particular RF modulation scheme used for the RF-I.

Figure 2A:
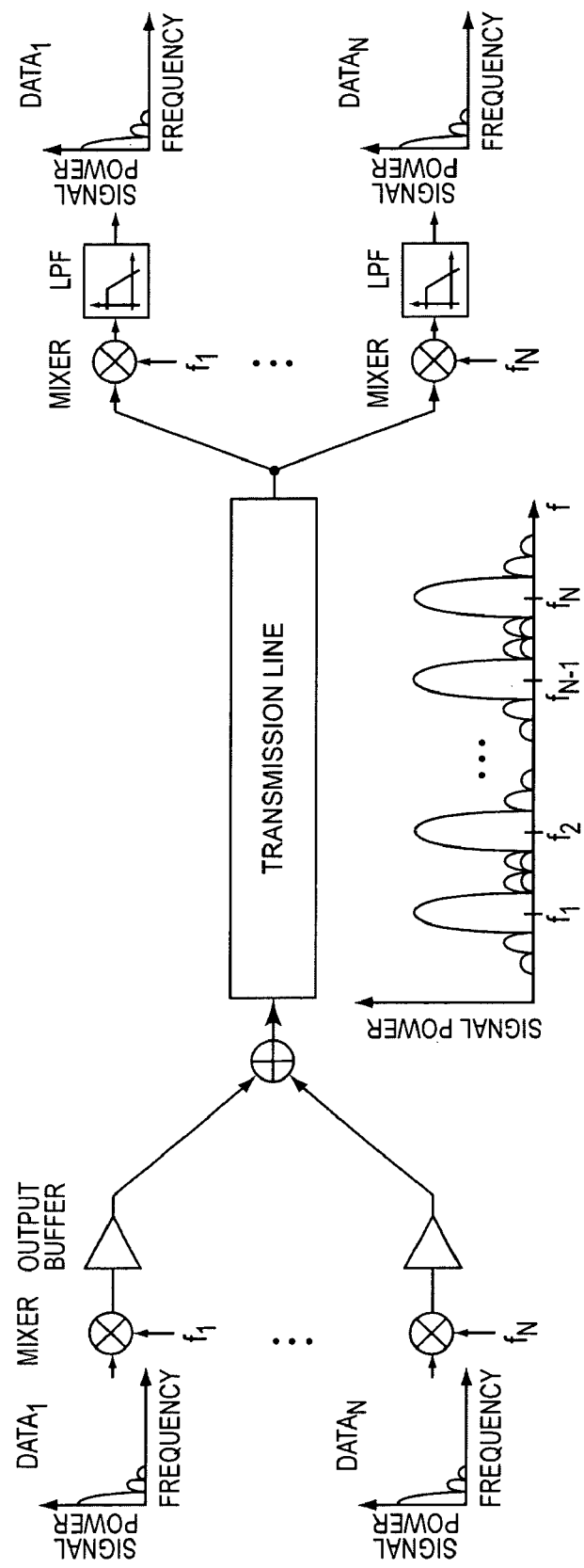
FIG. 2A conceptually illustrates the use of multiple RF carrier frequencies for a single RF interconnect or multiple simultaneous RF interconnects according to one embodiment of the present invention.
Figure 2B:
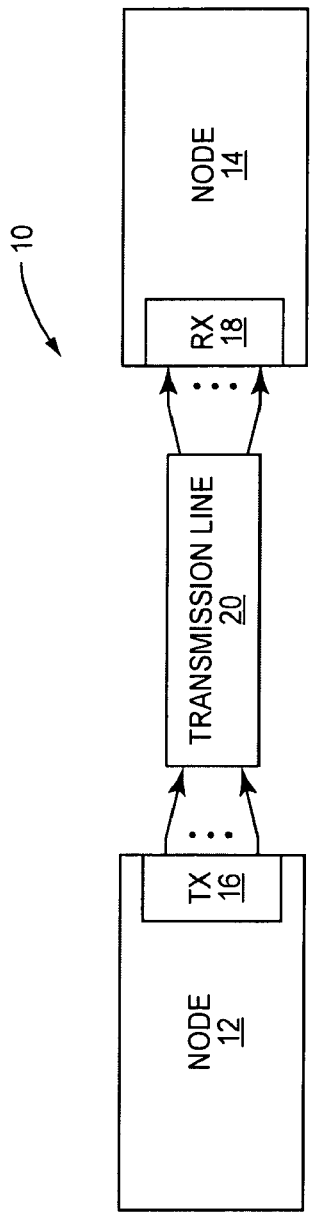
FIG. 2B illustrates an integrated circuit including an RF interconnect between on-chip circuit nodes that utilizes multiple RF carrier frequencies to provide a high aggregate data rate according to one embodiment of the present invention.

FIG. 2A conceptually illustrates another embodiment of the present invention wherein data is modulated onto a number (N) of carrier frequencies. As discussed below, the number (N) of carrier frequencies may be utilized to provide an aggregate data rate for a single RF-I and/or simultaneously provide multiple RF-Is between multiple groups or pairs of circuit nodes. FIG. 2B illustrates an embodiment of the integrated circuit 10 including the circuit nodes 12 and 14 wherein the number (N) of carrier frequencies are utilized to provide a single RF-I between the circuit nodes 12 and 14 via the associated RF transmitter and receiver 16 and 18 and the transmission line 20 according to one embodiment of the present invention. In this embodiment, the RF transmitter 16 simultaneously transmits data from the circuit node 12 on the number (N) of RF carrier frequencies. Different data is preferably transmitted over each of the number (N) of RF carrier frequencies such that an aggregate data rate provided by the RF-I using the number (N) of RF carrier frequencies is substantially greater than a data rate that could be achieved using a single RF carrier frequency.

More specifically, in order to transmit data from the circuit node 12 to the circuit node 14, the RF transmitter 16 receives data from the circuit node 12 and modulates the data onto the number (N) of RF carrier frequencies to provide corresponding modulated RF signals. The RF transmitter 16 combines the modulated RF signals and transmits the combined RF signal over the transmission line 20. The RF receiver 18 receives the combined RF signal and demodulates each of the modulated RF signals included in the combined RF signal using corresponding RF carrier frequency signals to recover the transmitted data for the circuit node 14.

Figure 2C:
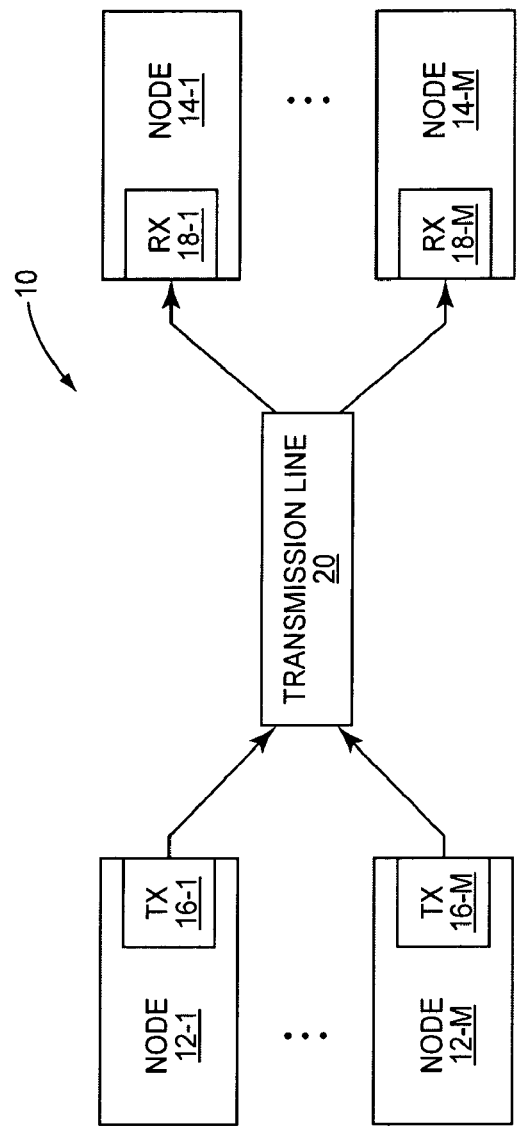
FIG. 2C illustrates an integrated circuit including multiple on-chip circuit nodes, wherein a number of RF carrier frequencies are utilized to provide multiple simultaneous RF interconnects according to one embodiment of the present invention.

FIG. 2C illustrates another embodiment of the integrated circuit 10 wherein the number (N) of carrier frequencies are utilized to provide multiple RF-Is between multiple groups or pairs of circuit nodes. More specifically, in this embodiment, the integrated circuit 10 includes a number of circuit nodes 12-1 through 12-M having associated RF transmitters (TXs) 16-1 through 16-M, and a number of circuit nodes 14-1 through 14-M having associated RF receivers (RXs) 18-1 through 18-M. Again, note that while the circuit nodes 12-1 through 12-M are illustrated as being associated with only the RF transmitters (TXs) 16-1 through 16-M and the circuit nodes 14-1 through 14-M are illustrated as being associated with only the RF receivers (RXs) 18-1 through 18-M, the present invention is not limited thereto. One or more of the circuit nodes 12-1 through 12-M may also be associated with an RF receiver, and one or more of the circuit nodes 14-1 through 14-M may also be associated with an RF transmitter. The circuit nodes 12-1 through 12-M and 14-1 through 14-M may be, for example, circuit nodes in a NoC, a System-on-Chip (SoC), or the like that utilize the transmission line 20 as an RF-I bus.

Using the circuit node 12-1 and the circuit node 14-1 as an exemplary transmit/receive pair, in order to provide an RF-I between the circuit node 12-1 and the circuit node 14-1 one or more RF carrier frequencies from the number (N) of RF carrier frequencies are allocated for the RF-I. For this example, assume that only one RF carrier frequency is allocated for the RF-I. However, any number of one or more of the number (N) of RF carrier frequencies may be allocated for the RF-I. The RF transmitter 16-1 then modulates data to be transmitted onto the RF carrier frequency allocated for the RF-I to provide a modulated RF signal. The RF transmitter 16-1 transmits the modulated RF signal over the transmission line 20. The RF receiver 18-1 receives the modulated RF signal and then performs a demodulation process to recover the transmitted data. In a similar manner, RF-Is may be provided between any desired pair of the circuit nodes 12-1 through 12-M and the circuit nodes 14-1 through 14-M. Further, by allocating a different RF carrier frequency or a different set of RF carrier frequencies for each of the RF-Is, the RF-Is may simultaneously be utilized on the same transmission line 20.

While FIG. 2C illustrates a Frequency Division Multiple Access (FDMA) scheme for RF-Is, other types of multiple access schemes may be used. For example, Code Division Multiple Access (CDMA) may alternatively be used. Other types of multiple access schemes will be apparent to one of ordinary skill in the art upon reading this disclosure and are to be considered within the scope of the present invention.

It should be noted that, in one embodiment, the present invention may also enable multicasting. More specifically, using the circuit node 12-1 as an example, the circuit node 12-1 may multicast data to two or more of the circuit nodes 14-1 through 14-M. The data may be multicast using a single RF carrier frequency. Alternatively, a data rate for the multicast RF-I may be increased by simultaneously transmitting data using two or more of the number (N) of RF carrier frequencies or all of the number (N) of RF carrier frequencies. As an example, the circuit node 12-1 may transmit data to all of the circuit nodes 14-1 through 14-M via a multicast RF-I. More specifically, the RF transmitter 16-1 may obtain the data to be transmitted and then modulate the data onto one or more RF carrier frequencies. In this example, assume that the data is modulated onto a single RF carrier frequency to provide a modulated RF signal. The RF transmitter 16-1 then transmits the modulated RF signal over the transmission line 20. The RF receivers (RXs) 18-1 through 18-M that desire to receive the multicast are tuned to the RF carrier frequency used by the RF transmitter 16-1 such that each of the RF receivers (RXs) 18-1 through 18-M receive and demodulate the modulated RF signal to recover the transmitted data.

Figure 3A:
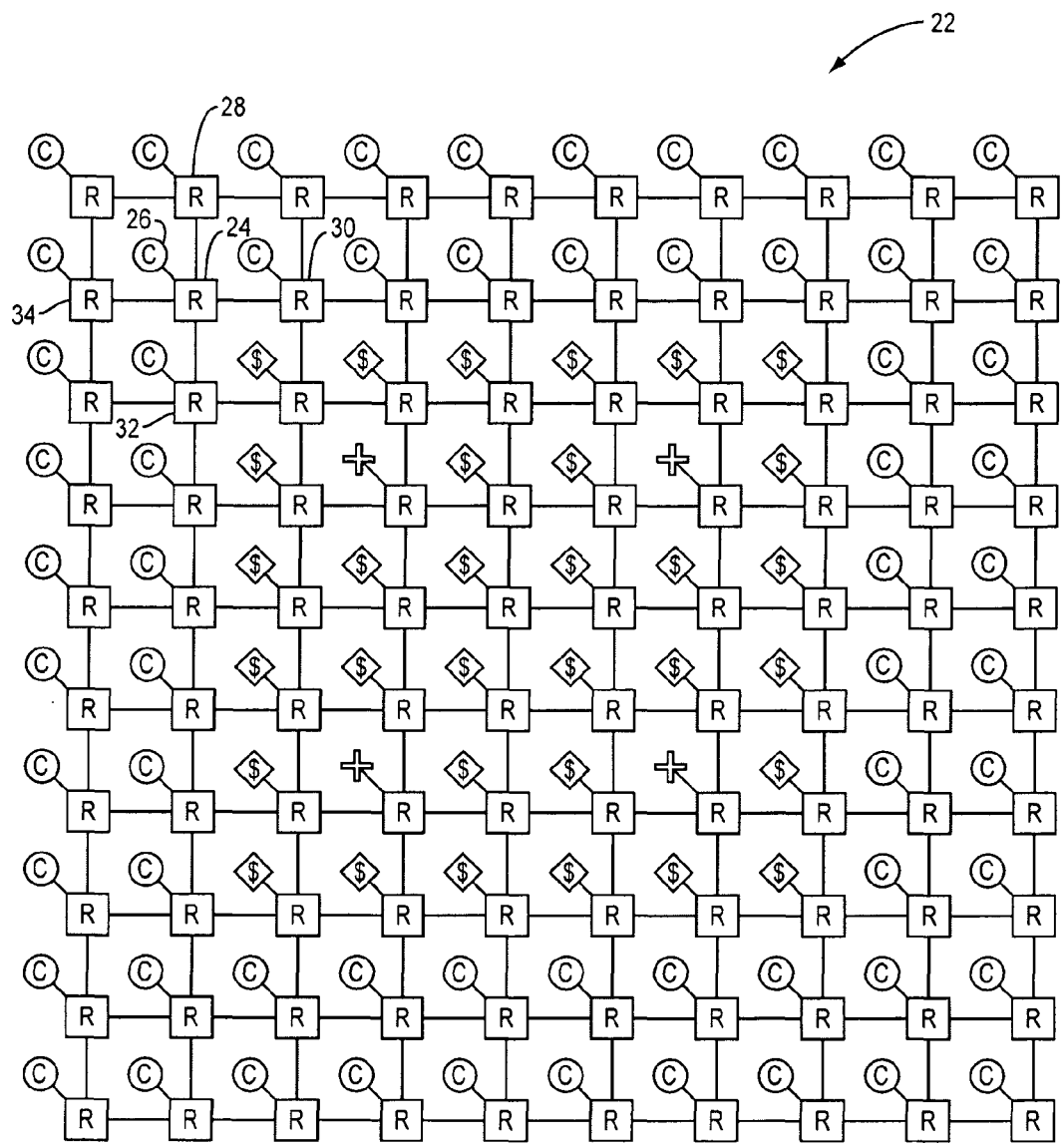
FIG. 3A illustrates a baseline Network-on-Chip (NoC)
Figure 3B:
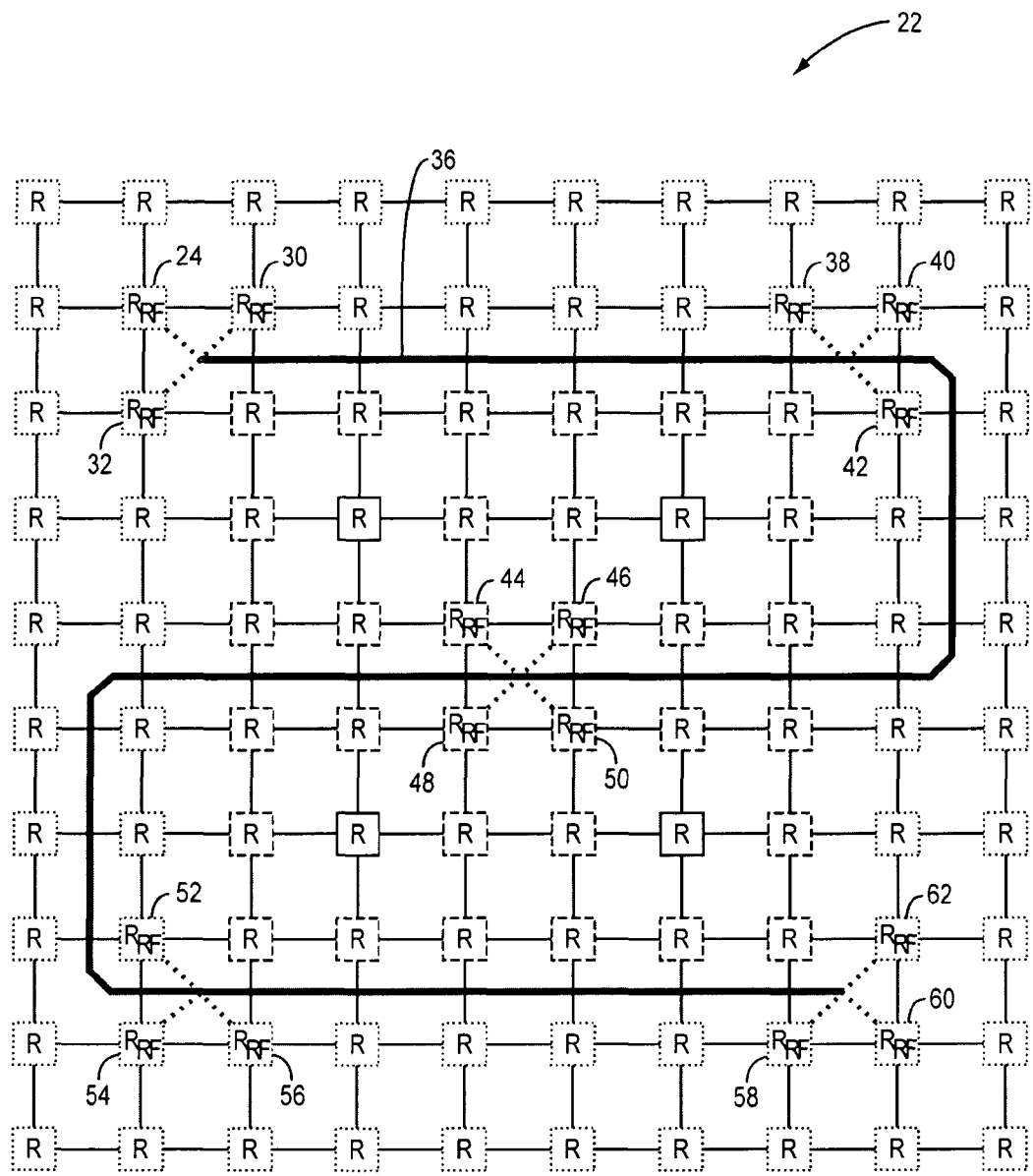
FIG. 3B illustrates a hybrid NoC including a number of RF interconnect shortcuts according to one embodiment of the present invention.

FIGS. 3A and 3B illustrate a two-layer hybrid NoC architecture for an integrated circuit that utilizes RF-Is as shortcuts according to one embodiment of the present invention. In this particular embodiment, FIGS. 3A and 3B illustrate a Mesh Overlaid with RF Interconnect (MORFIC) architecture. FIG. 3A illustrates an integrated circuit 22 having a baseline NoC architecture without the RF-I shortcuts according to one embodiment of the present invention. In this embodiment, the integrated circuit 22 includes a number of circuit nodes including processor cores (C), cache banks ($), and external memory interfaces (+). Note that the processor cores (C), cache banks ($) and external memory interfaces (+) are exemplary. Other types of circuit nodes may be additionally or alternatively included such as, for example, one or more application specific accelerators, one or more coprocessing engines, or one or more programmable fabrics.

A number of routers (R) interconnect the processor cores (C), the cache banks ($), and the external memory interfaces (+). More specifically, in this embodiment, each router (R) has five ports including a local port attached to a corresponding one of the processor cores (C), the cache banks ($), and the external memory interfaces (+), and four router ports that connect the router (R) to up to four neighboring routers (R) in the NoC. Using the router 24 as an example, the router 24 includes a local port connecting the router 24 to an associated processor core 26 and router ports connecting the router 24 to neighboring routers 28-34. Note that routers (R) at the edges of the NoC may have less than four router ports or may alternatively have unused router ports. Also note that because this is a two-dimensional embodiment, each router (R) is generally connected to up to four neighboring routers. However, the number of neighboring routers to which each router (R) is connected may increase if the number of dimensions for the NoC increases.

In one embodiment, the routers (R) are connected to one another and to their associated circuit nodes via on-chip wire buses that use RC signaling (i.e., charging and discharging of the wire lines to transmit data). For example, the routers (R) may be connected to one another and to their corresponding circuit nodes by 16 byte wide, single-cycle buses. Further, in this embodiment, the routers (R) may utilize XY/YX routing to route data in the baseline NoC. In XY/YX routing, each router (R) routes half of a number of data packets to be routed in the X dimension first, then along the Y dimension to their destination. The other half of the number of data packets to be routed are routed in the Y dimension first, then along the X dimension to their destination.

FIG. 3B illustrates the integrated circuit 22 of FIG. 3A with the addition of a number of RF-I shortcuts according to one embodiment of the present invention. By utilizing the RF-I shortcuts, communication latency is substantially reduced as compared to the communication latency of the baseline NoC without RF-I shortcuts. For clarity, FIG. 3B illustrates only the routers (R). However, it is to be understood that each of the routers (R) is connected to an associated circuit node.

In this embodiment, the integrated circuit 22 includes a transmission line 36 wherein at least some of the routers (R) in the baseline NoC are RF-enabled routers that are also connected to the transmission line 36 by associated RF transmitters and/or RF receivers. Specifically, in this embodiment, routers 24, 30, 32, and 38-62 are RF-enabled routers, each denoted as $R_{RF}$, that are connected to the transmission line 36 by associated RF transmitters and/or RF receivers. As an example, FIG. 4 illustrates an exemplary embodiment of the router 24.

Figure 4:
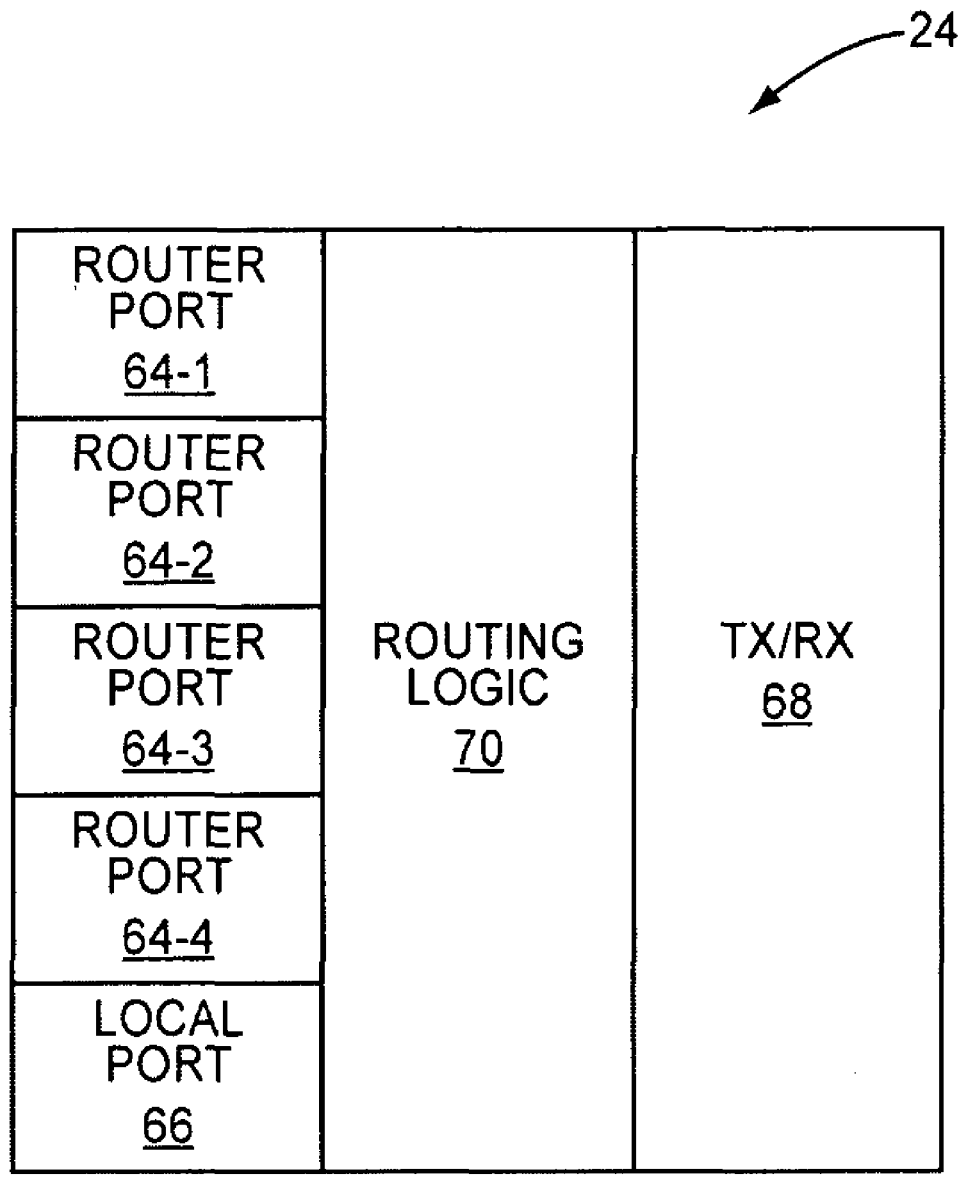
FIG. 4 is a block diagram of an exemplary RF-enabled router for a NoC according to one embodiment of the present invention.

FIG. 4 illustrates an exemplary embodiment of an RF-enabled router, which in this example is the RF-enabled router 24. As shown, the RF-enabled router 24 includes four router ports 64-1 through 64-4 for connecting the RF-enabled router 24 to the neighboring routers 28-34 (FIG. 3A) in the baseline NoC, a local port 66 for connecting to the associated processor core 26, and a transmitter/receiver (TX/RX) port 68 including, in this embodiment, an RF transmitter and an RF receiver for RF communication over the transmission line 36. Lastly, the RF-enabled router 24 includes routing logic 70 which operates to route incoming data to one of the ports 64-1 through 64-4, 66, and 68. Preferably, routing is performed using an associated routing table. The routing table may be static or dynamic and is configured based on the topology of the baseline NoC as well as the RF-I shortcuts overlaid upon the baseline NoC.

Returning to FIG. 3B, the particular routers that are RF-enabled routers ($R_{RF}$) connected to the transmission line 36 may be selected using any desired scheme. In this embodiment, the routers that are to be RF-enabled routers ($R_{RF}$) are selected at design time prior to fabrication. Further, in this embodiment, the selection of the routers that are to be RF-enabled routers ($R_{RF}$) are selected to minimize the number of cycles, and therefore latency, between distant routers in the baseline NoC. Specifically, the baseline NoC may logically be divided into five sectors consisting of four corner sectors including routers associated with processor cores (C) and a center sector for routers (R) associated with cache banks ($). The RF-enabled routers 24, 30, 32, and 38-62 may then be selected such that each sector can reach each other sector through the transmission line 36.

For example, the center sector may be connected to the four corner sectors by RF-I shortcuts between the RF-enabled routers 24 and 50, RF-I shortcuts between the RF-enabled routers 40 and 48, RF-I shortcuts between the RF-enabled routers 46 and 54, and RF-I shortcuts between the RF-enabled routers 44 and 60. RF-I shortcuts between the RF-enabled routers 30 and 56 and RF-I shortcuts between the RF-enabled routers 32 and 42 may connect the top left sector, the top right sector, and the bottom left sector. Lastly, RF-I shortcuts between the RF-enabled routers 38 and 58 and RF-I shortcuts between the RF-enabled routers 52 and 62 may connect the bottom right sector, the top right sector, and the bottom left sector. In this manner, each of the sectors is connected to each of the other sectors by RF-I shortcuts. Note that, in this embodiment, a direct RF-I shortcut between the top left sector and the bottom right sector and a direct RF-I shortcut between the top right sector and the bottom left sector are not provided. However, indirect RF-I shortcuts between these opposite corner sectors may be provided by routing through, for example, RF-I shortcuts to and from the RF-enabled routers 44-50 in the center sector.

As discussed above, routing tables are preferably utilized by the routers (R), including the RF-enabled routers 24, 30, 32, and 38-62 in the hybrid NoC architecture of FIG. 3B. In this embodiment, the routing tables are preferably statically configured based on a topology of the hybrid NoC architecture and the RF-I shortcuts provided by the RF-enabled routers 24, 30, 32, and 38-62 using an all-pairs shortest path algorithm. Deadlock conditions may be handled using a turn-model such as the South-West turn model. Alternatively, deadlock conditions may be detected and avoided using any desired deadlock detection and avoidance scheme.

Further, as discussed above, the RF-enabled routers 24, 30, 32, and 38-62 can simultaneously communicate over the transmission line 36 via corresponding RF-I shortcuts using a multiple-access scheme such as, for example, FDMA or CDMA. In one embodiment, an FDMA scheme is utilized to enable the RF-enabled routers 24, 30, 32, and 38-62 to share the transmission line 36 for the RF-I shortcuts. More specifically, RF carrier frequencies may be statically allocated to the RF-enabled routers 24, 30, 32, and 38-62 such that a different RF carrier frequency or set of RF carrier frequencies is statically allocated for each RF-I shortcut. Alternatively, RF carrier frequencies may be dynamically allocated to the RF-enabled routers 24, 30, 32, and 38-62 for the RF-I shortcuts during operation. If dynamic frequency allocation is desired, an arbitration function is required to assign RF carrier frequencies or sub-bands to the RF-enabled routers 24, 30, 32, and 38-62. The arbitration function may be performed by a separate component located on the integrated circuit 22 or performed in a distributed manner by the RF-enabled routers 24, 30, 32, and 38-62.

It should be noted that the hybrid NoC architecture of the integrated circuit 22 shown in FIG. 3B is exemplary. Numerous variations will be apparent to one of ordinary skill in the art upon reading this disclosure. For example, the number of RF-enabled routers may vary depending on the particular implementation. As another example, multiple access schemes other than FDMA may be utilized. Lastly, it should also be noted that while the hybrid NoC architecture of FIG. 3B utilizes both traditional wire line buses and RF-I shortcuts for communication between the routers (R), the present invention is not limited thereto. In another embodiment, an NoC may be formed using routers (R) connected with one another using only RF-Is such that, for example, each router (R) is connected to its neighboring routers (R) by RF-Is rather than traditional wire line buses.

Figure 5:
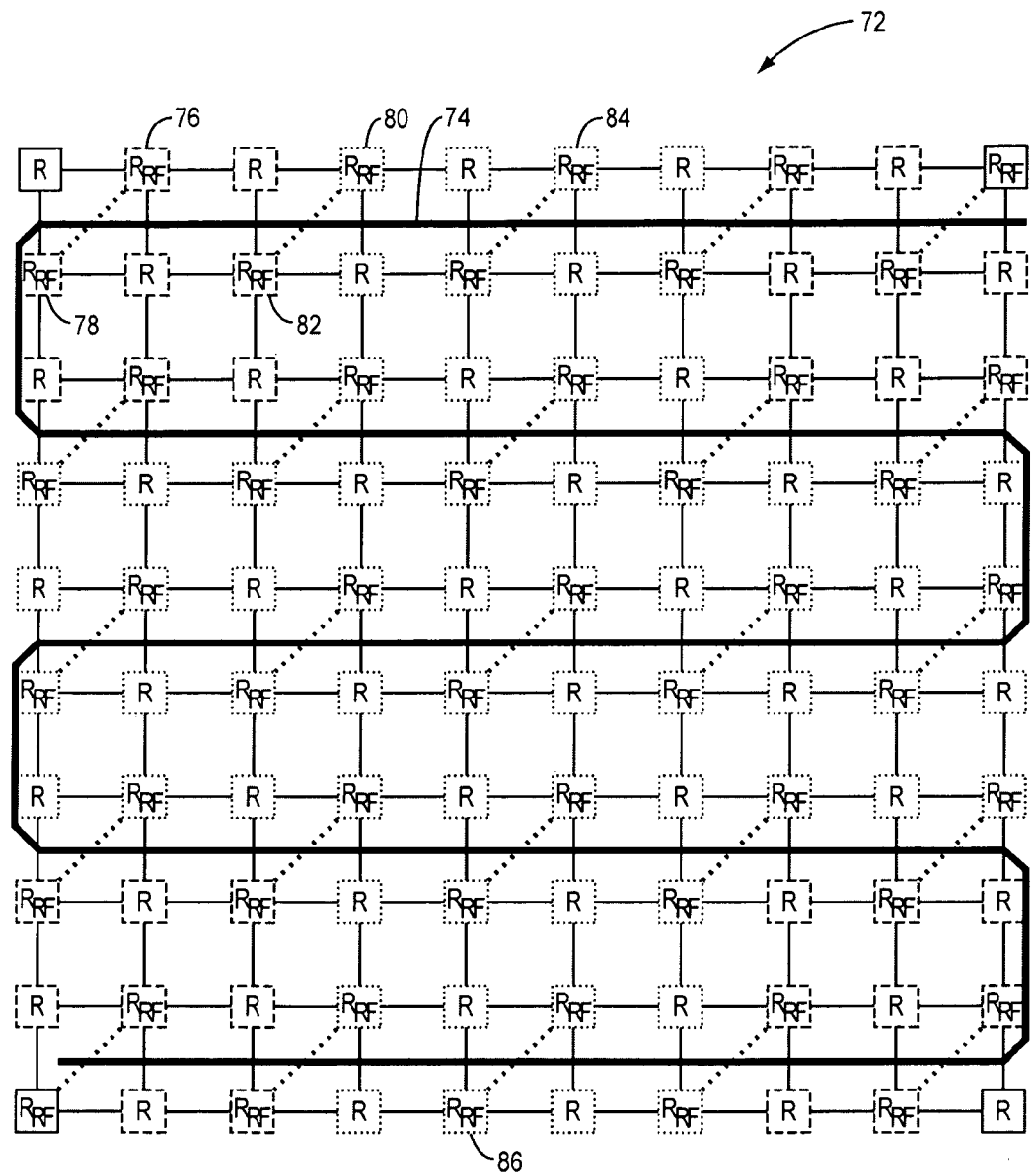
FIG. 5 illustrates an integrated circuit having a NoC including a number of RF-enabled routers enabled to provide reconfigurable RF interconnect shortcuts according to one embodiment of the present invention.

FIG. 5 illustrates an integrated circuit 72 having a reconfigurable NoC architecture according to one embodiment of the present invention. This embodiment is similar to that discussed above with respect to FIGS. 3A and 3B. However, in this reconfigurable NoC architecture, the RF-Is utilized as shortcuts are reconfigurable. Preferably, the RF-I shortcuts are configurable to meet current or expected demand of network traffic within the NoC. In other words, for the hybrid NoC of FIGS. 3A and 3B, while the frequency allocation for RF-I shortcuts may be static or dynamic, the endpoints (i.e., source and destination routers) are fixed. In contrast, in this embodiment, the RF-I shortcuts are configurable in that sources and destinations for the RF-I shortcuts may be changed.

As illustrated, the integrated circuit 72 includes a number of routers (R) including a number of RF-enabled routers ($R_{RF}$). In this embodiment, half of the routers (R) are RF-enabled routers ($R_{RF}$). However, the present invention is not limited thereto. For instance, in another embodiment, all of the routers (R) may be RF-enabled routers ($R_{RF}$). As discussed above, each router (R/$R_{RF}$) has a local connection to a circuit node such as, for example, a processing core, a cache bank, or an external memory interface. In one embodiment, each of the RF-enabled routers ($R_{RF}$) includes a radio frequency interface (i.e., an RF transmitter and/or RF receiver) connected to a transmission line 74. In another embodiment, rather than each RF-enabled router ($R_{RF}$) having a separate RF interface, nearby RF-enabled routers ($R_{RF}$) may share an RF interface. For instance, in this exemplary embodiment, each pair of RF-enabled routers ($R_{RF}$) connected to a common point on the transmission line 74 via dashed lines may share an RF interface. Thus, in this example, RF-enabled routers ($R_{RF}$) 76 and 78 may shared an RF interface, RF-enabled routers ($R_{RF}$) 80 and 82 may share an RF interface, etc.

In order to establish an RF-I shortcut from, for example, RF-enabled router ($R_{RF}$) 84 and RF-enabled router ($R_{RF}$) 86, one or more RF carrier frequencies are allocated for the RF-I shortcut. The RF-enabled router ($R_{RF}$) 84 is then instructed to transmit at the one or more RF carrier frequencies allocated for the RF-I shortcut, and the RF-enabled router ($R_{RF}$) 86 is instructed to tune to, or receive at, the one or more RF carrier frequencies allocated for the RF-I shortcut. In a similar manner, any number of RF-I shortcuts may be created between desired groups or pairs of RF-enabled routers ($R_{RF}$). Note that not all RF-enabled routers ($R_{RF}$) may be used for an RF-I shortcut depending on the particular implementation.

The selection of RF-I shortcuts may be performed ahead of time by the application writer or compiler or at run time by the operating system, a hypervisor, or in the hardware itself. Each selected RF-I shortcut is created or implemented by instructing the corresponding RF-enabled routers ($R_{RF}$) to tune to an RF carrier frequency or set of RF carrier frequencies allocated for the RF-I shortcut. Routing tables in the routers including both RF-enabled routers ($R_{RF}$) and routers (R) that are not RF-enabled are updated based on the topology of the NoC including the RF-I shortcuts. The routing tables may be created using an all-pairs shortest path algorithm.

Figure 6:
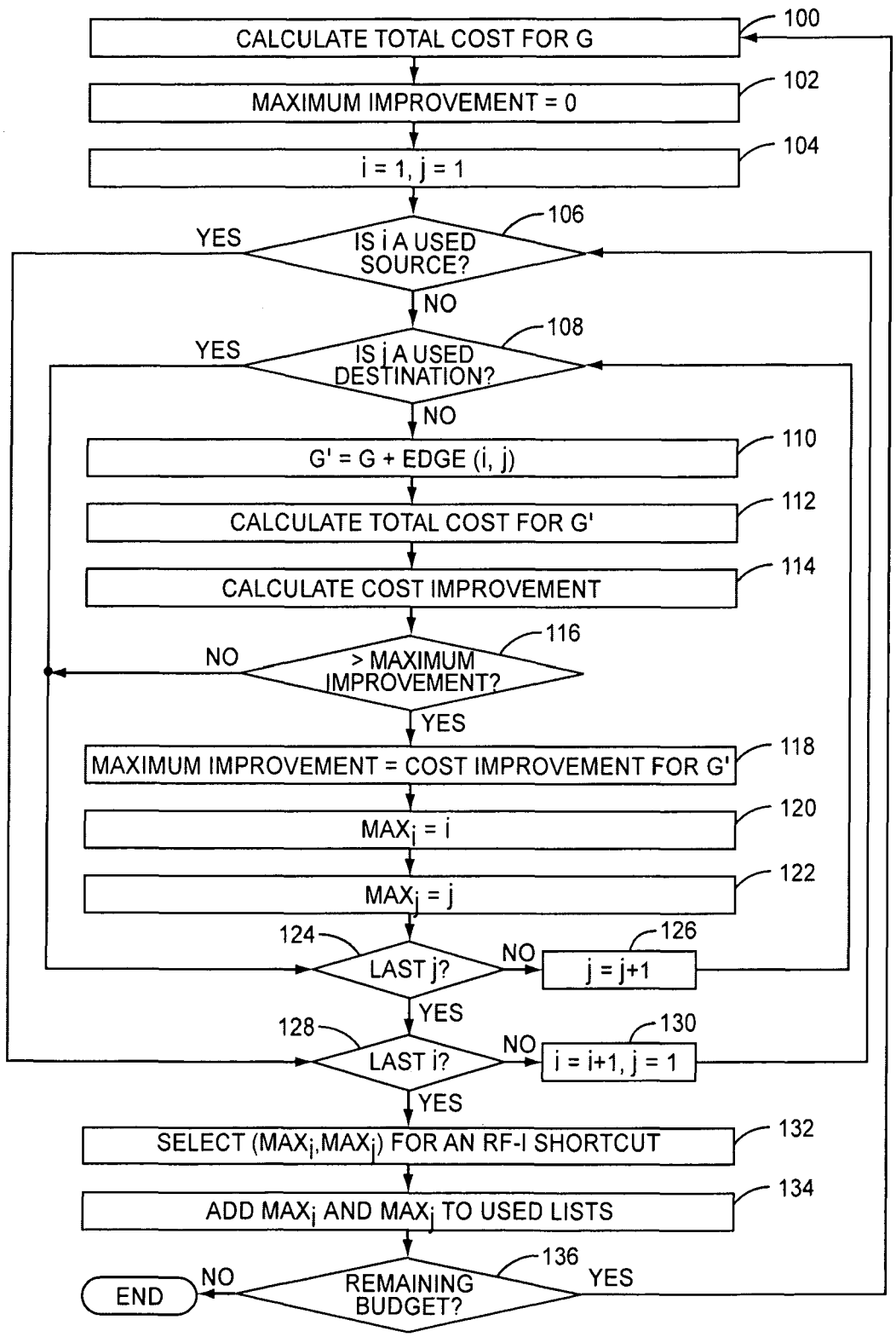
FIG. 6 illustrates an architecture-specific process for selecting RF interconnect shortcuts for the NoC of the integrated circuit of FIG. 5 according to one embodiment of the present invention.

FIG. 6 is a flow chart illustrating an architecture-specific RF-I shortcut selection process according to one embodiment of the present invention. In general, the process of FIG. 6 operates to select RF-I shortcuts that minimize communication latency for the NoC. Specifically, in this embodiment, the RF-I shortcuts are selected based on minimizing a cost function $W_{x,y}$, where the cost function $W_{x,y}$ estimates a cost of communicating between a pair of routers x and y in a given topology for the NoC. In one embodiment, the cost function $W_{x,y}$ provides the number of steps in a shortest path from router x to router y in a given topology for the NoC. The RF-I shortcut selection process may be performed ahead of time by the application writer or compiler or at run time by the operating system, a hypervisor, or in the hardware itself.

First, a total cost is calculated for a current topology for the NoC, which in this embodiment is represented as a directed grid graph G whose vertices are the routers (R/R$_{RF}$) in the NoC (step 100). Note that for the first iteration, the current topology for the NoC is the topology of the baseline NoC. However, as RF-I shortcuts are selected, the current topology for the NoC also includes the selected RF-I shortcuts, where the selected RF-I shortcuts are directed edges added to the directed grid graph G. In this embodiment, the total cost for G is defined as:

$$TotalCost(G) = \sum_{all(x,y)} W_{x,y}$$

for all router pairs (x,y) in G. Again, $W_{x,y}$ is a cost function that estimates the cost of communication between a pair of routers (x,y) in a given NoC, which in this instance is represented by G.

Next, a maximum improvement is set to 0 (step 102), and variables i and j are both set to 1 (step 104). A determination is then made as to whether RF-enabled router$_i$ is a used source (step 106). RF-enabled router$_i$ is a used source if an RF-I shortcut from RF-enabled router$_i$ to some other RF-enabled router has already been selected. If RF-enabled router$_i$ is a used source, then the process proceeds to step 128. If RF-enabled router$_i$ is not a used source, a determination is then made as to whether RF-enabled router$_j$ is a used destination (step 108). RF-enabled router$_j$ is a used destination if an RF-I shortcut from another RF-enabled router to RF-enabled router$_j$ has already been selected. If RF-enabled router$_j$ is a used destination, the process proceeds to step 124. If RF-enabled router$_j$ is not a used destination, then a temporary directed grid graph G' is generated such that G' is equal to the G plus an additional directed edge from RF-enabled router$_i$ to RF-enabled router$_j$ (step 110). A total cost for G' is then computed (step 112). In this embodiment, the total cost for G' is defined as:

$$TotalCost(G') = \sum_{all(x,y)} W_{x,y}$$

for all router pairs (x,y) in G'. Again, $W_{x,y}$ is a cost function that estimates the cost of communication between a pair of routers (x,y) in a given NoC, which in this instance is represented by G'.

A cost improvement is then calculated for the temporary directed grid graph G' (step 114). More specifically, in this embodiment, the cost improvement is calculated as:

CostImprovement=TotalCost(G')−TotalCost(G).

A determination is then made as to whether the cost improvement for G' is greater than the maximum improvement (step 116). If not, the process proceeds to step 124. Otherwise, the maximum improvement is set to the cost improvement for G' (step 118), a variable max$_i$ is set to i (step 120), and a variable max$_j$ is set to j (step 122).

At this point, a determination is made as to whether a last value of j has been reached (i.e., the last RF-enabled router has been processed for the current value of i) (step 124). If not, j is incremented by 1 (step 130), and the process then returns to step 108 and is repeated. Once the last value of j has been reached, a determination is made as to whether a last value of i has been reached (i.e., the last RF-enabled router has been processed) (step 128). If not, i is incremented by 1 and j is set to 1 (step 130), and the process returns to step 106 and is repeated. Once the last value of i has been reached, edge (max$_i$, max$_j$) is selected for an RF-I shortcut (step 132). In other words, RF-enabled router(max$_j$) is selected as a source for an RF-I shortcut, and RF-enabled router (max) is selected as a destination for the RF-I shortcut. At this point, the directed edge (max$_i$, max$_j$) is added to the directed grid graph G. Further, max$_i$ is added to a list of used sources, and max$_j$ is added to a list of used destinations (step 134). In this manner, only one RF-I shortcut can originate from any one RF-enabled router. Likewise, only one RF-I shortcut can terminate at any one RF-enabled router.

Lastly, a determination is then made as to whether there is any remaining budget for RF-I shortcuts (step 136). Specifically, a budget may define a maximum number of RF-I shortcuts that may be used. The maximum number of RF-I shortcuts may be a physical maximum based on the number of RF-enabled routers in the NoC or some artificial maximum that is less than the physical maximum. If there are more RF-I shortcuts in the budget, the process returns to step 100 and is repeated. Once the budget is exhausted, the process ends.

Figure 7:
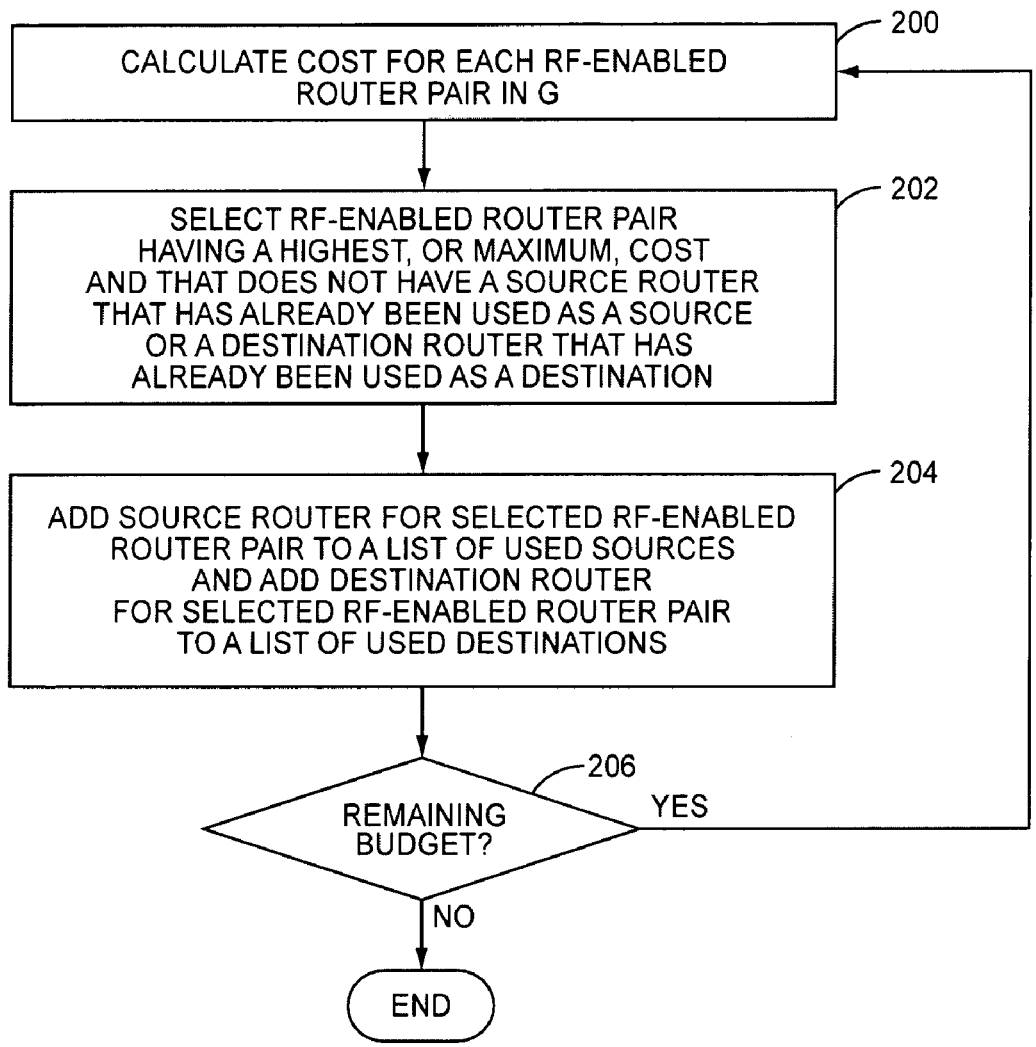
FIG. 7 illustrates an architecture-specific process for selecting RF interconnect shortcuts for the NoC of the integrated circuit of FIG. 5 according to another embodiment of the present invention.

FIG. 7 is a flow chart illustrating an architecture-specific RF-I shortcut selection process according to another embodiment of the present invention. In general, the process of FIG. 7 operates to select RF-I shortcuts that minimize communication latency for the NoC. Specifically, in this embodiment, the RF-I shortcuts are selected based on minimizing a cost function $W_{x,y}$, where the cost function $W_{x,y}$ estimates a cost of communicating between a pair of routers x and y in a given topology for the NoC. The RF-I shortcut selection process may be performed ahead of time by the application writer or compiler or at run time by the operating system, a hypervisor, or in the hardware itself.

First, a cost is calculated for each pair of RF-enabled routers in the NoC (step 200). In this embodiment, the cost for an RF-enabled router pair (x,y) is defined as:

Cost(router$_{x,y}$)=$W_{x,y}$, where $W_{x,y}$ is a cost function that estimates the cost of communication between a pair of RF-enabled routers (x,y) in the NoC.

Next, an RF-enabled router pair having a highest, or maximum, cost and that does not have a source router that has already been used as a source for another RF-I shortcut or a destination router that has already been used as a destination for another RF-I shortcut is selected for a new RF-I shortcut (step 202). A source router for the selected RF-enabled router pair (i.e., a source router for the new RF-I shortcut) is then added to a list of used sources, and a destination router for the selected RF-enabled router pair (i.e., a destination router for the new RF-I shortcut) is added to a list of used destinations (step 204). Lastly, a determination is then made as to whether there is any remaining budget for RF-I shortcuts (step 206). Specifically, a budget may define a maximum number of RF-I shortcuts that may be used. The maximum number of RF-I shortcuts may be a physical maximum based on the number of RF-enabled routers in the NoC or some artificial maximum that is less than the physical maximum. If there are more RF-I shortcuts in the budget, the process returns to step 200 and is repeated. Once the budget is exhausted, the process ends.

Figure 8:
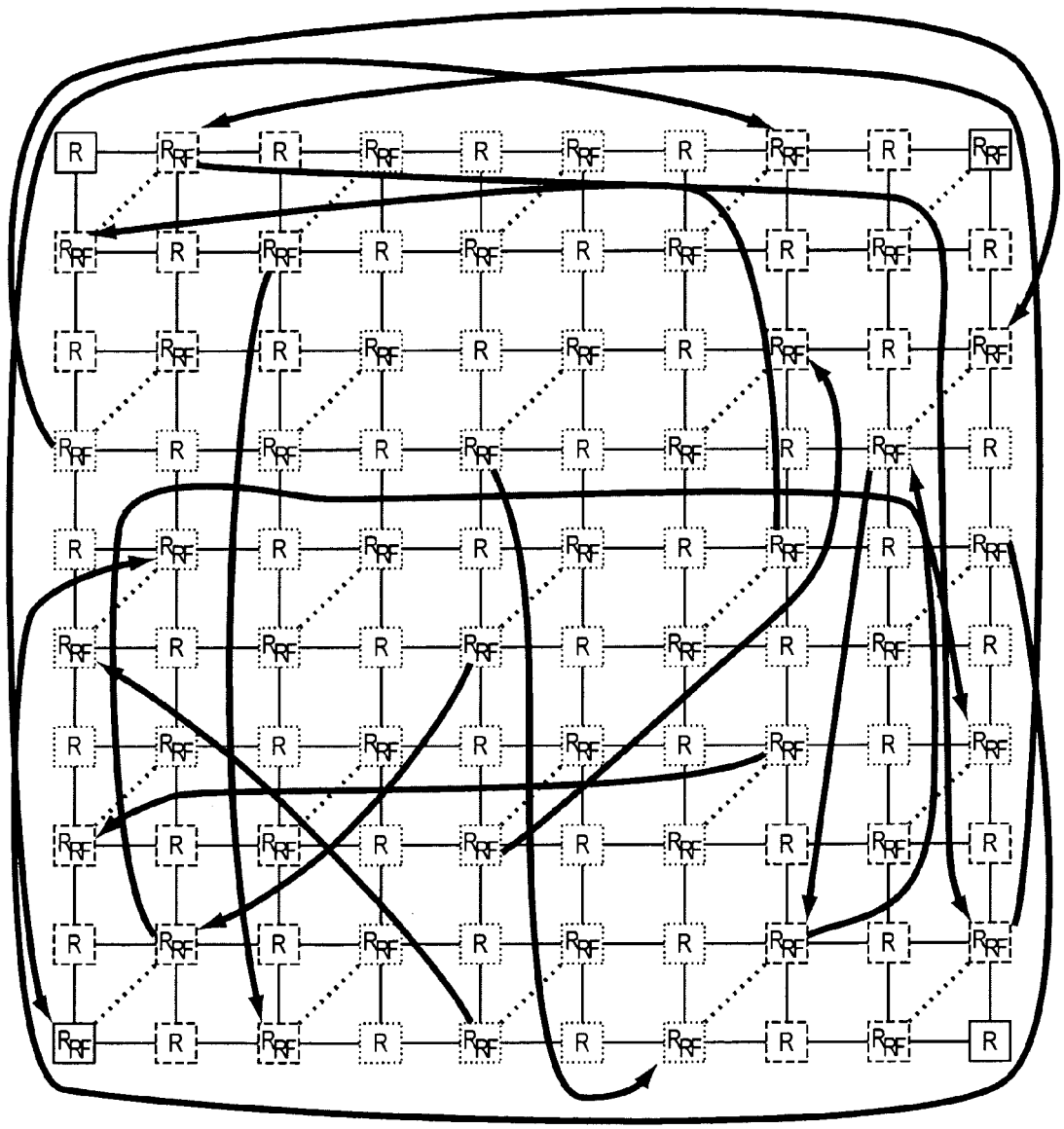
FIG. 8 illustrates a number of exemplary RF interconnect shortcuts selected according to either the process of FIG. 6 or the process of FIG. 7.

FIG. 8 illustrates a number of exemplary RF-I shortcuts selected and created to the integrated circuit 72 of FIG. 5 using either of the processes of FIGS. 6 and 7. As shown, in this embodiment, each RF-enabled router ($R_{RF}$) has at most one RF-I shortcut originating at that RF-enabled router ($R_{RF}$) and one RF-I shortcut terminating at that RF-enabled router ($R_{RF}$). As a result of the RF-I shortcuts, the communication latency of the integrated circuit 72 is substantially improved as compared to that of the baseline NoC architecture. Further, power consumption may be reduced because RF communication is generally more power efficient than wire bus communication. Further, when using RF-I shortcuts, the wire buses used to connect the routers in the baseline NoC do not need to be as wide as would otherwise be necessary (e.g., 8 bytes (B) wide rather than 32 B wide), which in turn reduces power consumption. It should be noted that the architecture-specific RF-I shortcut selection processes discussed above with respect to FIGS. 6-8 are exemplary and not intended to limit the scope of the present invention. Any process that selects RF-I shortcuts based on the specific architecture of the NoC may be used.

Figure 9:
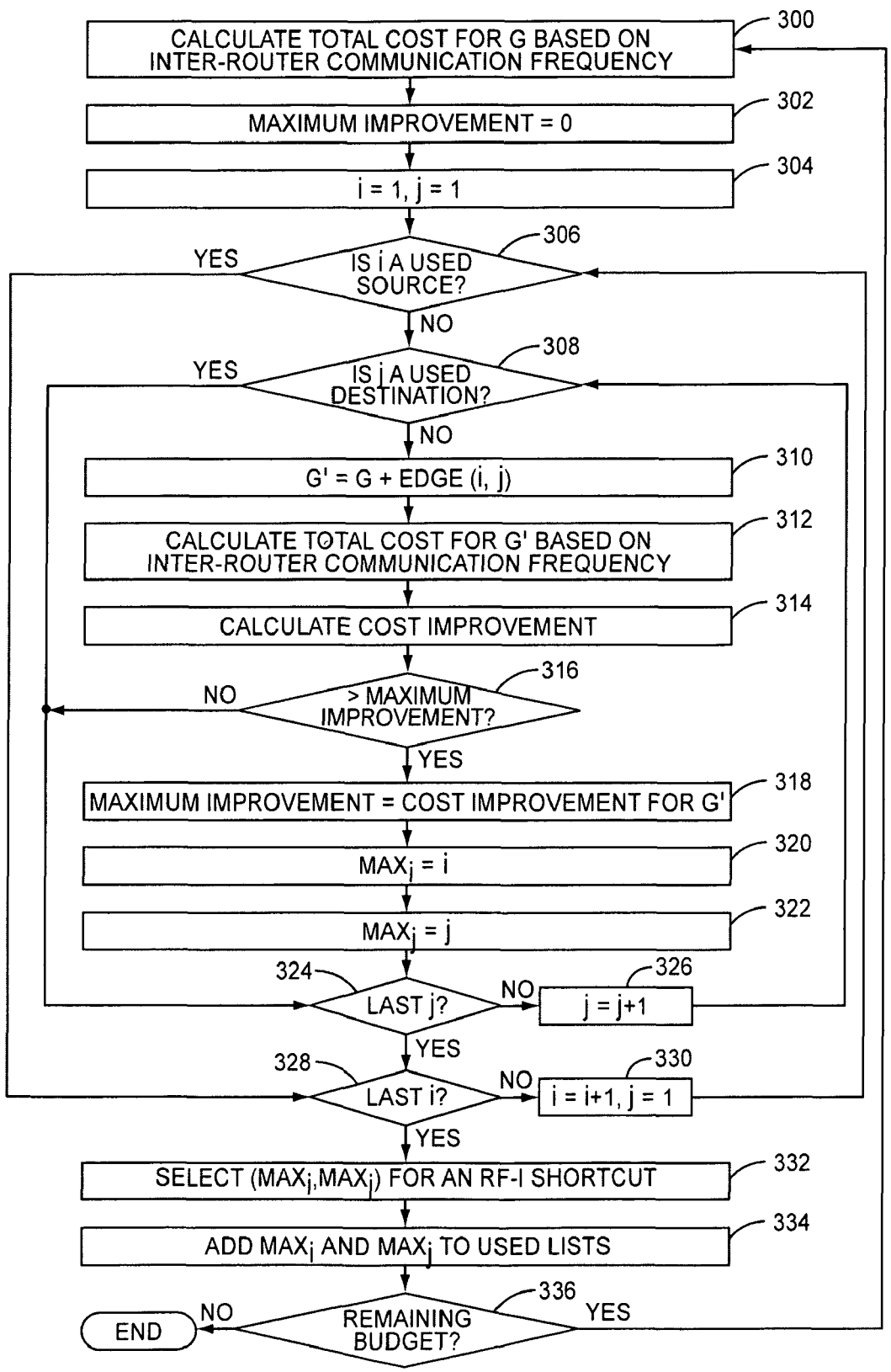
FIG. 9 illustrates an application-specific process for selecting RF interconnect shortcuts for the NoC of the integrated circuit of FIG. 5 according to one embodiment of the present invention.

FIG. 9 illustrates an exemplary application-specific RF-I shortcut selection process according to one embodiment of the present invention. The RF-I shortcut selection process may be performed ahead of time by the application writer or compiler or at run time by the operating system, a hypervisor, or in the hardware itself. In general, this process enables the RF-I shortcuts to dynamically be reconfigured for each application, or per workload. Intuitively, this process selects the RF-I shortcuts in such a manner as to accelerate communication on paths that are most frequently used by the particular application. In order to identify theses paths, in this embodiment, inter-router communication frequency is monitored. From a given router x to another router y, communication frequency is measured as the number of messages sent from router x to router y over a defined period of time. A profile describing the inter-router communication frequency for each router pair (x,y) for the application is preferably determined prior to performing the process of FIG. 9.

First, in order to select RF-I shortcuts for an application, a total cost is calculated for a current topology for the NoC, which in this embodiment is represented as a directed grid graph G whose vertices are the routers (R/$R_{RF}$) in the NoC, based on inter-router communication frequency for the application (step 300). Note that for the first iteration, the current topology for the NoC is the topology of the baseline NoC. However, as RF-I shortcuts are selected, the current topology for the NoC also includes the selected RF-I shortcuts, where the selected RF-I shortcuts are directed edges added to the directed grid graph G. In this embodiment, the total cost for G is defined as:

$$TotalCost(G) = \sum_{all(x,y)} F_{x,y} \cdot W_{x,y}$$

for all router pairs (x,y) in G. Again, $W_{x,y}$ is a cost function that estimates the cost of communication between a pair of routers (x,y) in a given NoC, which in this instance is represented by G. $F_{x,y}$ is an inter-router communication frequency for a pair of routers (x,y) in G, which in this embodiment is a total number of messages sent from router x to router y for the application during a defined period of time.

Next, a maximum improvement is set to 0 (step 302), and variables i and j are both set to 1 (step 304). A determination is then made as to whether RF-enabled router$_i$ is a used source (step 306). RF-enabled router$_i$ is a used source if an RF-I shortcut from RF-enabled router$_i$ to some other RF-enabled router has already been selected. If RF-enabled router$_i$ is a used source, then the process proceeds to step 328. If RF-enabled router$_i$ is not a used source, a determination is then made as to whether RF-enabled router$_j$ is a used destination (step 308). RF-enabled router$_j$ is a used destination if an RF-I shortcut from another RF-enabled router to RF-enabled router$_j$ has already been selected. If RF-enabled router$_j$ is a used destination, the process proceeds to step 324. If RF-enabled router$_j$ is not a used destination, then a temporary directed grid graph G' is generated such that G' is equal to the G plus an additional directed edge from RF-enabled router$_i$ to RF-enabled router$_j$ (step 310). A total cost for G' is then computed (step 312). In this embodiment, the total cost for G' is defined as:

$$TotalCost(G') = \sum_{all(x,y)} F_{x,y} \cdot W_{x,y}$$

for all router pairs (x,y) in G'. Again, $W_{x,y}$ is a cost function that estimates the cost of communication between a pair of routers (x,y) in a given NoC, which in this instance is represented by G'. $F_{x,y}$ is an inter-router communication frequency for a pair of routers (x,y) in G', which in this embodiment is a total number of messages sent from router x to router y for the application during a defined period of time.

A cost improvement is then calculated for the temporary directed grid graph G' (step 314). More specifically, in this embodiment, the cost improvement is calculated as:

$$CostImprovement = TotalCost(G') - TotalCost(G).$$

A determination is then made as to whether the cost improvement for G' is greater than the maximum improvement (step 316). If not, the process proceeds to step 324. Otherwise, the maximum improvement is set to the cost improvement for G' (step 318), a variable max$_i$ is set to i (step 320), and a variable max$_j$ is set to j (step 322).

At this point, a determination is made as to whether a last value of j has been reached (i.e., the last RF-enabled router has been reached for the current value of i) (step 324). If not, j is incremented by 1 (step 326), and the process then returns to step 308 and is repeated. Once the last value of j has been reached, a determination is made as to whether a last value of i has been reached (i.e., the last RF-enabled router has been processed) (step 328). If not, i is incremented by 1 and j is set to 1 (step 330), and the process returns to step 306 and is repeated. Once the last value of i has been reached, edge (max$_i$, max$_j$) is selected for an RF-I shortcut (step 332). In other words, RF-enabled router(max$_i$) is selected as a source for an RF-I shortcut, and RF-enabled router (max$_j$) is selected as a destination for the RF-I shortcut. At this point, the directed edge (max$_i$, max$_j$) is added to the directed grid graph G. Further, max$_i$ is added to a list of used sources, and max$_j$ is added to a list of used destinations (step 334). In this manner, only one RF-I shortcut can originate from any one RF-enabled router. Likewise, only one RF-I shortcut can terminate at any one RF-enabled router.

Lastly, a determination is then made as to whether there is any remaining budget for RF-I shortcuts (step 336). Specifically, a budget may define a maximum number of RF-I shortcuts that may be used. The maximum number of RF-I shortcuts may be a physical maximum based on number of RF-enabled routers in the NoC or some artificial maximum that is less than the physical maximum. If there are more RF-I shortcuts in the budget, the process returns to step 300 and is repeated. Once the budget is exhausted, the process ends.

Figure 10:
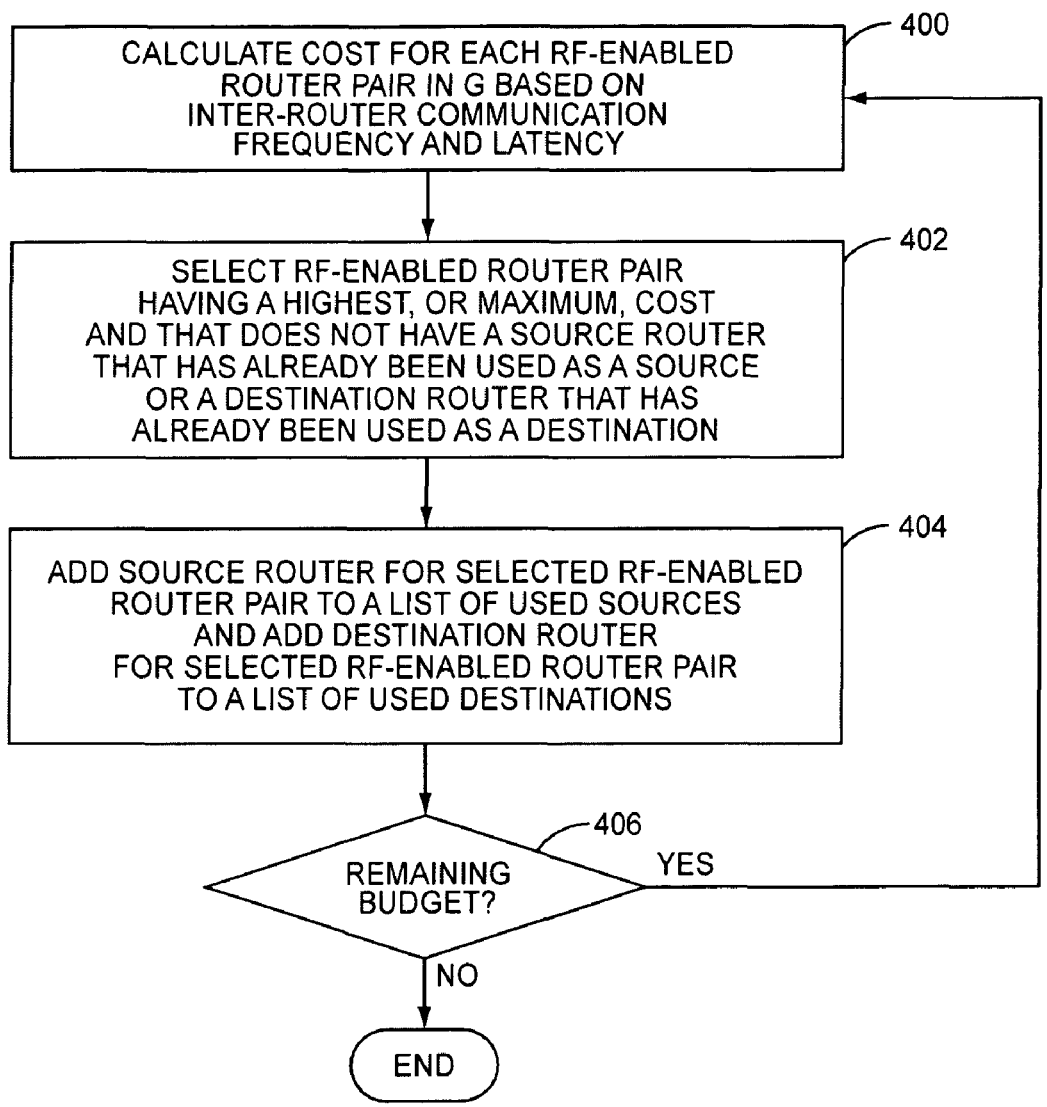
FIG. 10 illustrates an application-specific process for selecting RF interconnect shortcuts for the NoC of the integrated circuit of FIG. 5 according to another embodiment of the present invention.

FIG. 10 is a flow chart illustrating an exemplary application-specific RF-I shortcut selection process according to another embodiment of the present invention. In general, the process of FIG. 10 operates to select RF-I shortcuts that minimize communication latency for the NoC for the particular application. The RF-I shortcut selection process may be performed ahead of time by the application writer or compiler or at run time by the operating system, a hypervisor, or in the hardware itself.

First, a cost is calculated for each pair of RF-enabled routers in the NoC based on inter-router communication frequency for the application (step 400). In this embodiment, the cost for an RF-enabled router pair (x,y) is defined as:

$$\text{Cost}(\text{router}_{x,y}) = F_{x,y} \cdot W_{x,y},$$

where $W_{x,y}$ is a cost function that estimates the cost of communication between a pair of RF-enabled routers (x,y) in the NoC, which in this instance is represented by G. $F_{x,y}$ is an inter-router communication frequency for a pair of RF-enabled routers (x,y), which in this embodiment is a total number of messages sent from RF-enabled router x to RF-enabled router y for the application during a defined period of time.

Next, an RF-enabled router pair having a higher, or maximum, cost and that does not have a source router that has already been used as a source for another RF-I shortcut or a destination router that has already been used as a destination for another RF-I shortcut is selected for a new RF-I shortcut for the application (step 402). A source router for the selected RF-enabled router pair (i.e., a source router for the new RF-I shortcut) is then added to a list of used sources, and a destination router for the selected RF-enabled router pair (i.e., a destination router for the new RF-I shortcut) is added to a list of used destinations (step 404). Lastly, a determination is then made as to whether there is any remaining budget for RF-I shortcuts (step 406). Specifically, a budget may define a maximum number of RF-I shortcuts that may be used. The maximum number of RF-I shortcuts may be a physical maximum based on number of RF-enabled routers in the NoC or some artificial maximum that is less than the physical maximum. If there are more RF-I shortcuts in the budget, the process returns to step 400 and is repeated. Once the budget is exhausted, the process ends.

Figure 11:
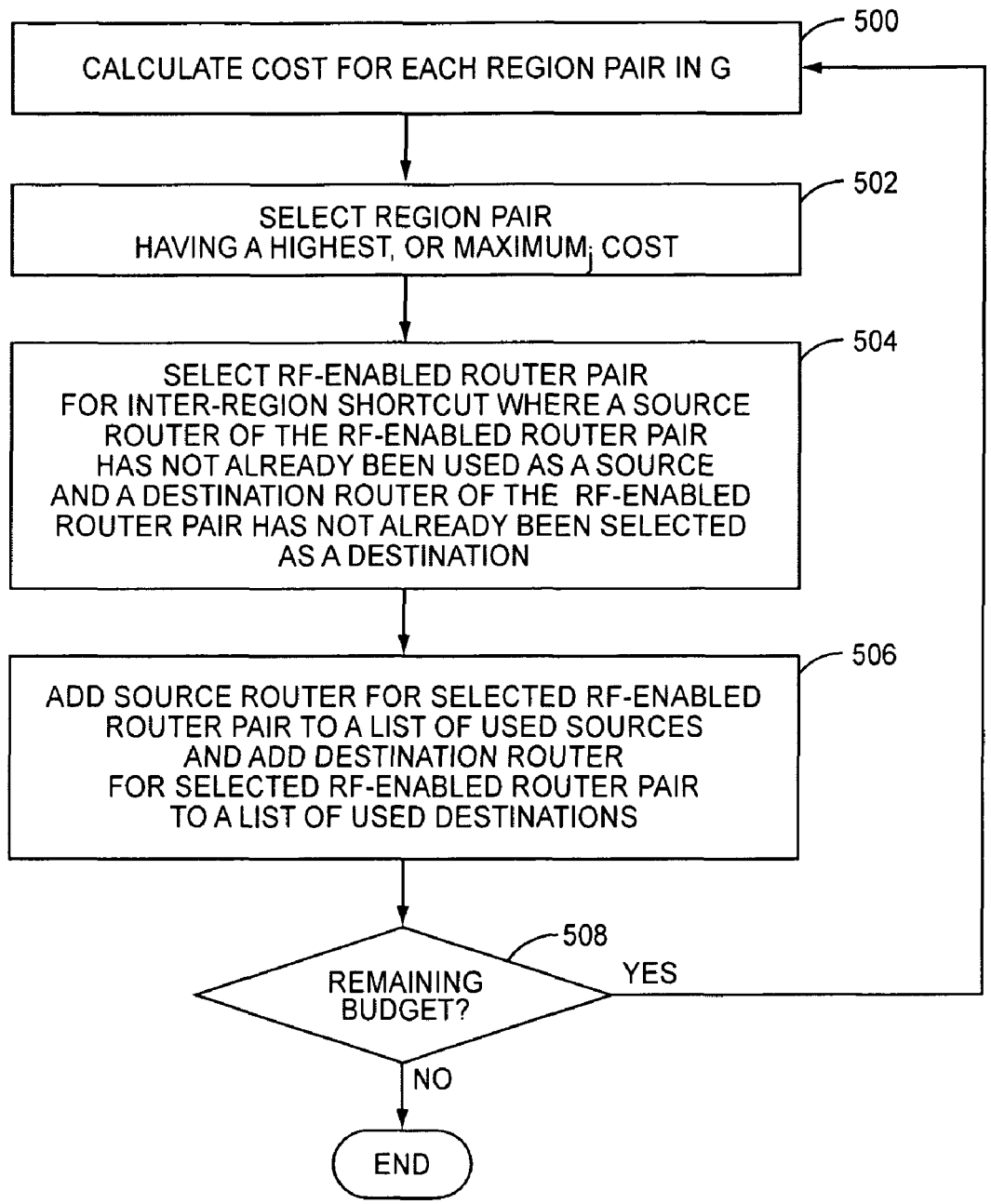
FIG. 11 illustrates an application-specific process for selecting RF interconnect shortcuts for the NoC of the integrated circuit of FIG. 5 that allows for communication hotspots according to one embodiment of the present invention.

FIG. 11 illustrates an exemplary process for selecting RF-I shortcuts that accounts for communication hotspots according to one embodiment of the present invention. The RF-I shortcut selection process may be performed ahead of time by the application writer or compiler or at run time by the operating system, a hypervisor, or in the hardware itself. Specifically, in the preferred embodiment, discussed herein, each RF-enabled router in the NoC includes only one TX/RX port such that at most one RF-I shortcut can originate from the RF-enabled router and at most one RF-I shortcut can terminate at the RF-enabled router. However, there may be applications in which communication hotspots exist. As used herein, a communication hotspot is an RF-enabled router having a relatively high inter-router communication frequency with respect to messages sent to multiple other RF-enabled routers and/or a relatively high inter-router communication frequency with respect to messages received from multiple other RF-enabled routers.

First, the NoC, which is represented as a directed grid graph G, is logically divided into a number of regions and, for each region pair, a cost is calculated (step 500). In this embodiment, the cost for a particular region pair (A,B) is calculated as:

$$\text{ReigonCost}_{A,B} = \sum_{\text{all}(x \in A, y \in B)} F_{x,y} \cdot W_{x,y}.$$

Again, $W_{x,y}$ is a cost function that estimates the cost of communication between a pair of routers (x,y) in regions A and B, respectively, of a given NoC, which in this instance is represented by G. $F_{x,y}$ is an inter-router communication frequency for a pair of routers (x,y), which in this embodiment is a total number of messages sent from router x to router y for the application during a defined period of time.

Next, a region pair having a highest, or maximum, cost is selected (step 502). Then, an RF-enabled router pair for a new inter-region RF-I shortcut is selected (step 504). More specifically, an RF-enabled router from region A of the selected region pair (region A, region B) that has not already been selected as a source for another RF-I shortcut is selected as a source router for the new inter-region RF-I shortcut. Similarly, an RF-enabled router from region B of the selected region pair (region A, region B) that has not already been selected as a destination for another RF-I shortcut is selected as a destination router for the new inter-region RF-I shortcut. The source router for the selected RF-enabled router pair (i.e., the source router for the new inter-region RF-I shortcut) is then added to a list of used sources, and the destination router for the selected RF-enabled router pair (i.e., the destination router for the new inter-region RF-I shortcut) is added to a list of used destinations (step 506).

Lastly, a determination is then made as to whether there is any remaining budget for RF-I shortcuts (step 508). Specifically, a budget may define a maximum number of RF-I shortcuts that may be used. The maximum number of RF-I shortcuts may be a physical maximum based on number of RF-enabled routers in the NoC or some artificial maximum that is less than the physical maximum. If there are more RF-I shortcuts in the budget, the process returns to step 500 and is repeated. Once the budget is exhausted, the process ends.

Figure 12:
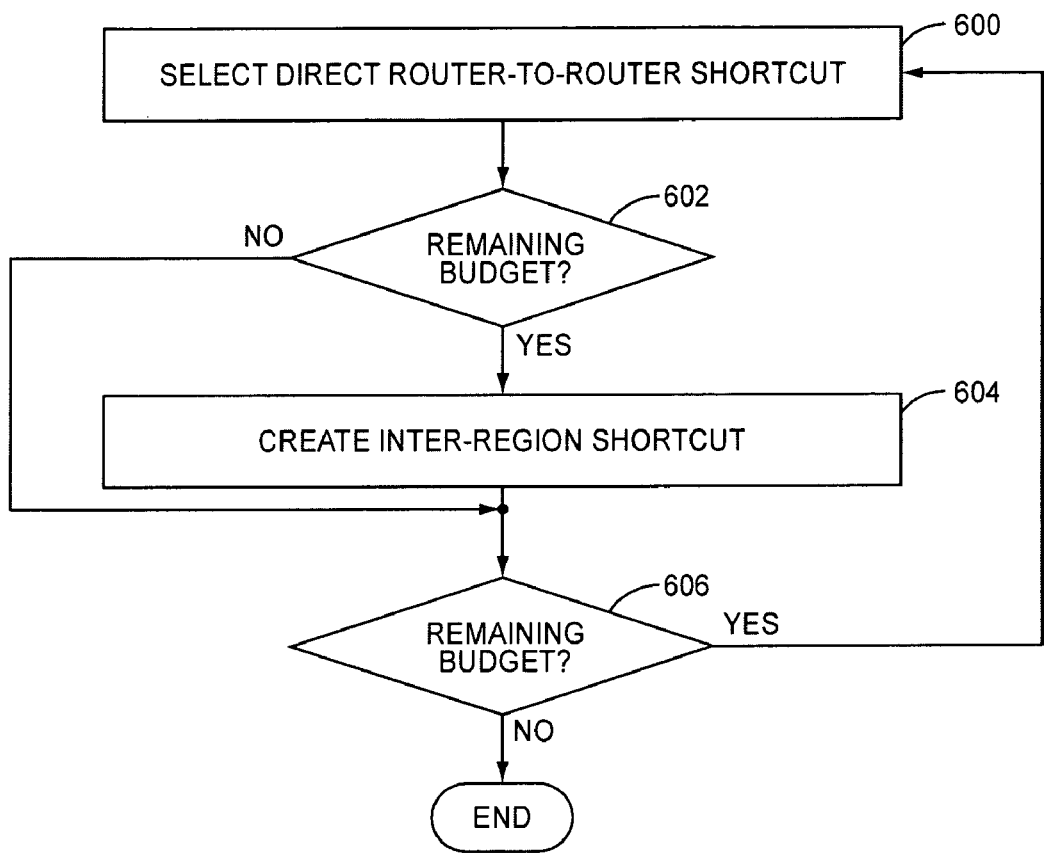
FIG. 12 illustrates an application-specific process for selecting RF interconnect shortcuts for the NoC of the integrated circuit of FIG. 5 that allows for communication hotspots according to another embodiment of the present invention.

FIG. 12 illustrates a process for selecting RF-I shortcuts that alternates between selecting inter-region RF-I shortcuts according to the process of FIG. 11 and selecting RF-I shortcuts according to the process of either FIG. 9 or FIG. 10 according to another embodiment of the present invention. The RF-I shortcut selection process may be performed ahead of time by the application writer or compiler or at run time by the operating system, a hypervisor, or in the hardware itself.

First, a direct router-to-router RF-I shortcut is selected according to one iteration of either the process of FIG. 9 or the process of FIG. 10 (step 600). Next, a determination is made as to whether there is any remaining budget for RF-I shortcuts (step 602). If not, the process ends. Otherwise, an inter-region RF-I shortcut is selected according to one iteration of the process of FIG. 11 (step 604). Then, another determination is made as to whether there is any remaining budget for RF-I shortcuts (step 606). If not, the process ends. Otherwise, the process returns to step 600 and is repeated.

Figure 13:
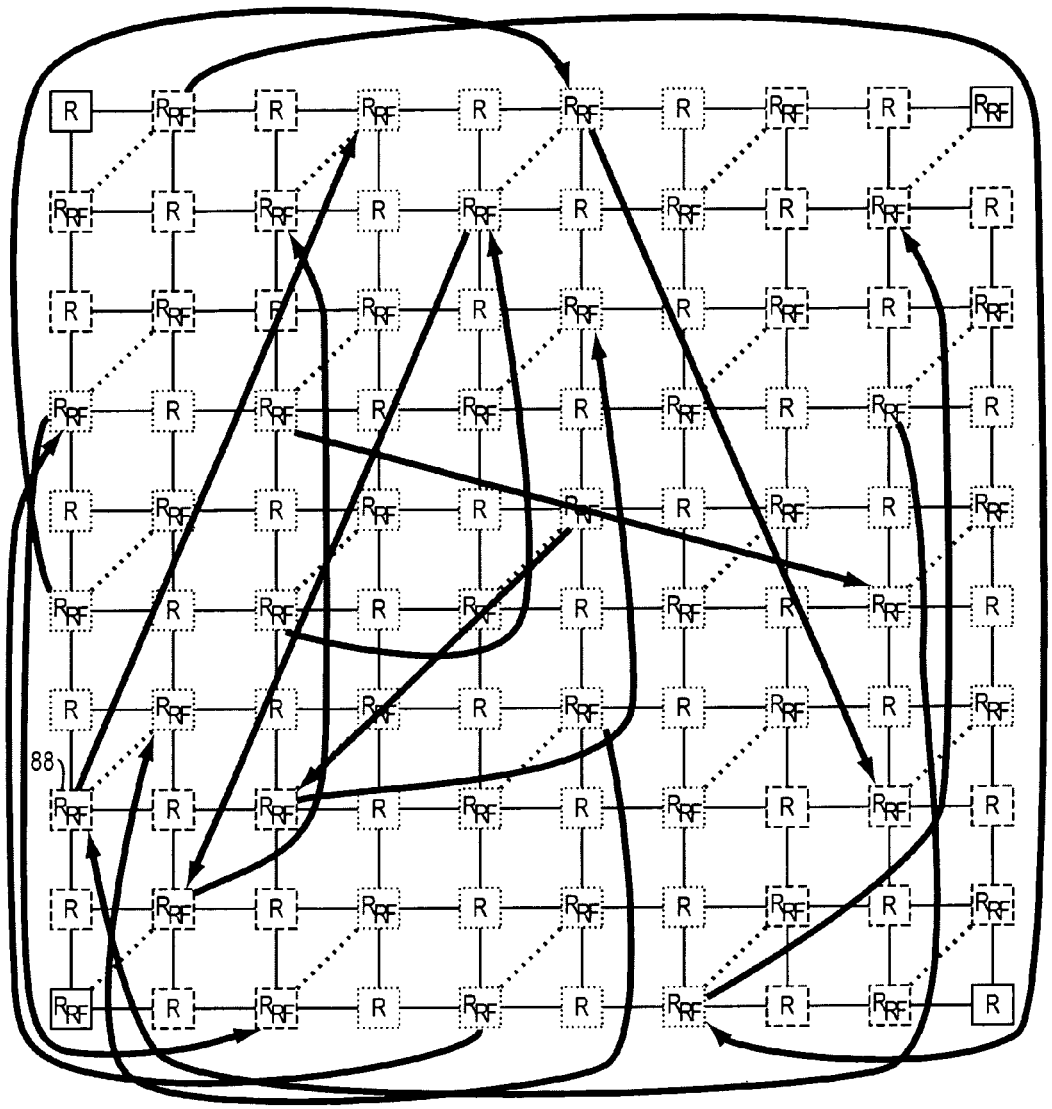
FIG. 13 illustrates a number of exemplary RF Interconnect (RF-I) shortcuts selected and created for the integrated circuit of FIG. 5 using either of the processes of FIGS. 11 and 12.

FIG. 13 illustrates a number of exemplary RF-I shortcuts selected and created for the integrated circuit 72 of FIG. 5 using either of the processes of FIGS. 11 and 12. As shown, in this embodiment, each RF-enabled router ($R_{RF}$) has at most one RF-I shortcut originating at that RF-enabled router ($R_{RF}$) and one RF-I shortcut terminating at that RF-enabled router ($R_{RF}$). However, in order to accommodate communication hotspots, many RF-I shortcuts either originate from or terminate at RF-enabled routers ($R_{RF}$) in regions of the NoC that include communication hotspots. Specifically, in this example, RF-enabled router 88 is a communication hotspot. As such, there are many RF-I shortcuts originating and terminating in the associated region of the NoC. As a result of the RF-I shortcuts, the communication latency of the integrated circuit 72 is substantially improved as compared to that of the baseline NoC architecture. Further, power consumption may be reduced. It should be noted that the application-specific RF-I shortcut selection processes discussed above with respect to FIGS. 9-13 are exemplary and not intended to limit the scope of the present invention. Any process that selects RF-I shortcuts to reduce communication latency based on one or more characteristics of the NoC for a particular application may be used.

The present invention offers substantial opportunity for variation without departing from the spirit or scope of the present invention. For example, while in the embodiments discussed above, RF-enabled routers include, or are associated with, only one RF interface, the present invention is not limited thereto. Each RF-enabled router may include, or be associated with, multiple RF interfaces such that each RF-enabled interface may be the source of one or more RF-I shortcuts and/or a destination of one or more RF-I shortcuts. As another example, while the baseline NoC discussed above is particularly a 2-dimensional (2-D) mesh network, any type of baseline NoC may be used. Further, the baseline NoC may alternatively be K-dimensional (K-D).

Those skilled in the art will recognize improvements and modifications to the embodiments of the present invention. All such improvements and modifications are considered within the scope of the concepts disclosed herein and the claims that follow.

What is claimed is:

1. An integrated circuit comprising:
a transmission line;
a first circuit node associated with a radio frequency (RF) transmitter connected to the transmission line; and
a second circuit node associated with an RF receiver connected to the transmission line,
the RF transmitter being adapted to modulate data to be transmitted from the first circuit node onto an RF carrier frequency to provide a modulated RF signal and transmit the modulated RF signal over the transmission line, and
the RF receiver being adapted to receive the modulated RF signal from the transmission line and demodulate the modulated RF signal to recover the data for the second circuit node such that an on-chip RF interconnect between the first circuit node and the second circuit node is provided.

2. The integrated circuit of claim 1 wherein the first circuit node, the RF transmitter, the second circuit node, the RF receiver, and the transmission line are implemented within the integrated circuit.

3. The integrated circuit of claim 1 wherein:
the RF transmitter is adapted to:
modulate a plurality of data streams including different portions of the data to be transmitted from the first circuit node onto a plurality of RF carrier frequencies including the RF carrier frequency to provide a plurality of modulated RF signals including the modulated RF signal; and
transmit the plurality of modulated RF signals over the transmission line; and
the RF receiver is adapted to:
receive the plurality of modulated RF signals from the transmission line; and
demodulate the plurality of modulated RF signals to recover the data for the second circuit node.

4. The integrated circuit of claim 1 further comprising a plurality of RF-enabled circuit nodes, including the first circuit node and the second circuit node, each associated with at least one of an RF transmitter and an RF receiver connected to the transmission line, wherein a multiple access scheme is utilized to provide a plurality of simultaneous RF interconnects over the transmission line, each of the plurality of simultaneous RF interconnects being an RF interconnect between the RF transmitter associated with one of the plurality of RF-enabled circuit nodes and the RF receiver associated with another one of the plurality of RF-enabled circuit nodes.

5. The integrated circuit of claim 1 further comprising a plurality of second circuit nodes, including the second circuit node, each associated with one of a plurality of RF receivers, wherein the RF transmitter is adapted to modulate the data to be transmitted from the first circuit node onto the RF carrier frequency to provide the modulated RF signal and multicast the modulated RF signal to at least two of the plurality of RF receivers over the transmission line.

6. The integrated circuit of claim 1 wherein the RF transmitter is part of the first circuit node, and the RF receiver is part of the second circuit node.

7. The integrated circuit of claim 1 further comprising a plurality of routers forming a Network-on-Chip (NoC) for the integrated circuit including at least two RF-enabled routers, and wherein the RF transmitter is part of a first RF-enabled router of the at least two RF-enabled routers that is connected to the first circuit node, and the RF receiver is part of a second RF-enabled router of the at least two RF-enabled routers that is connected to the second circuit node.

8. The integrated circuit of claim 7 wherein each of the first circuit node and the second circuit node is one of a group consisting of: a processor core, a cache bank, an interface to external memory, an application specific accelerator, a coprocessing engine, and a programmable fabric.

9. The integrated circuit of claim 7 wherein the plurality of routers are interconnected via wire line buses in a baseline architecture, and an RF interconnect provided from the RF transmitter of the first RF-enabled router and the RF receiver of the second RF-enabled router forms a shortcut between the first RF-enabled router and the second RF-enabled router in the NoC.

10. The integrated circuit of claim 1 wherein the first circuit node and the second circuit node are nodes in a System-on-Chip (SoC).

11. An integrated circuit comprising:
a transmission line; and
a plurality of circuit nodes having associated RF transmitters and RF receivers connected to the transmission line, wherein the plurality of circuit nodes communicate via one or more RF interconnects formed by the associated RF transmitters and RF receivers over the transmission line such that the transmission line forms an RF interconnect bus for communication between the plurality of circuit nodes.

12. An integrated circuit comprising:
a transmission line; and
a plurality of routers connected via wire line buses to form a Network-on-Chip (NoC) for the integrated circuit, at least two routers of the plurality of routers being Radio Frequency—(RF) enabled routers, each RF-enabled router being associated with at least one of an RF transmitter and an RF receiver connected to the transmission line, wherein at least one RF interconnect shortcut for the NoC is provided using the RF-enabled routers, each RF interconnect shortcut being an RF interconnect from one of the RF-enabled routers to another one of the RF-enabled routers via the transmission line.

13. The integrated circuit of claim 12 wherein the at least one RF interconnect shortcut is static in terms of a source RF-enabled router and a destination RF-enabled router of the at least one RF interconnect shortcut.

14. The integrated circuit of claim 12 wherein the at least one RF interconnect shortcut is reconfigurable in terms of a source RF-enabled router and a destination RF-enabled router of the at least one RF interconnect shortcut.

15. The integrated circuit of claim 12 wherein at least one carrier frequency is statically allocated for the at least one RF interconnect shortcut.

16. The integrated circuit of claim 12 wherein at least one carrier frequency is dynamically allocated for the at least one RF interconnect shortcut.

17. The integrated circuit of claim 12 wherein the at least one RF interconnect shortcut is a plurality of RF interconnect shortcuts, and a multiple access scheme is utilized such that data can be simultaneously transmitted over the transmission line using the plurality of RF interconnect shortcuts.

18. The integrated circuit of claim 12 wherein the at least one RF interconnect shortcut is selected based on a topology of the NoC.

19. The integrated circuit of claim 12 wherein the at least one RF interconnect shortcut is selected to minimize communication overhead based on a topology of the NoC.

20. The integrated circuit of claim 12 wherein for each RF interconnect shortcut of the at least one RF interconnect shortcut, selection of the RF interconnect shortcut is performed by:

calculating a total cost in terms of communication overhead for a current topology of the NoC with respect to interconnections of the plurality of routers and any previously selected RF interconnect shortcuts;

for each pair of RF-enabled routers:
calculating a total cost in terms of communication overhead for a modified topology of the NoC formed by the current topology of the NoC plus an RF interconnect shortcut from a first RF-enabled router of the pair of RF-enabled routers to a second RF-enabled router of the pair of RF-enabled routers; and
calculating a cost improvement based on a difference between the total cost for the modified topology of the NoC and the total cost for the current topology of the NoC; and selecting a pair of RF-enabled routers having a maximum cost improvement for the RF interconnect shortcut such that the RF interconnect shortcut is established from the first RF-enabled router of the selected pair of RF-enabled routers to the second RF-enabled router of the selected pair of RF-enabled routers.

21. The integrated circuit of claim 12 wherein for each RF interconnect shortcut of the at least one RF interconnect shortcut, selection of the RF interconnect shortcut is performed by:

for each pair of RF-enabled routers, calculating a cost in terms of communication overhead for the pair of RF-enabled routers in a current topology of the NoC with respect to interconnections of the plurality of routers and any previously selected RF interconnect shortcuts; and selecting a pair of RF-enabled routers having a maximum cost for the RF interconnect shortcut such that the RF interconnect shortcut is established from a first RF-enabled router of the selected pair of RF-enabled routers to a second RF-enabled router of the selected pair of RF-enabled routers.

22. The integrated circuit of claim 12 wherein the at least one RF interconnect shortcut is selected for a particular application of the integrated circuit.

23. The integrated circuit of claim 12 wherein the at least one RF interconnect shortcut is selected for a particular application of the integrated circuit based on inter-router communication frequency between the plurality of routers for the particular application.

24. The integrated circuit of claim 12 wherein for each RF interconnect shortcut of the at least one RF interconnect shortcut, selection of the RF interconnect shortcut is performed for a particular application of the integrated circuit by:

calculating a total cost for communication in a current topology of the NoC for the particular application;

for each pair of RF-enabled routers:
calculating a total cost for communication in a modified topology of the NoC formed by the current topology of the NoC plus an RF interconnect shortcut from a first RF-enabled router of the pair of RF-enabled routers to a second RF-enabled router of the pair of RF-enabled routers for the particular application; and
calculating a cost improvement based on a difference between the total cost for the modified topology of the NoC and the total cost for the current topology of the NoC; and selecting a pair of RF-enabled routers having a maximum cost improvement for the RF interconnect shortcut such that the RF interconnect shortcut is established from the first RF-enabled router of the selected pair of RF-enabled routers to the second RF-enabled router of the selected pair of RF-enabled routers.

25. The integrated circuit of claim 12 wherein for each RF interconnect shortcut of the at least one RF interconnect shortcut, selection of the RF interconnect shortcut is performed for a particular application of the integrated circuit by:

calculating a total cost for a current topology of the NoC based on an inter-router communication frequency profile defining an inter-router communication frequency between each pair of routers in the plurality of routers for the particular application;

for each pair of RF-enabled routers:
calculating a total cost for a modified topology of the NoC formed by the current topology of the NoC plus an RF interconnect shortcut from a first RF-enabled router of the pair of RF-enabled routers to a second RF-enabled router of the pair of RF-enabled routers based on the inter-router communication frequency profile; and
calculating a cost improvement based on a difference between the total cost for the modified topology of the NoC and the total cost for the current topology of the NoC; and selecting a pair of RF-enabled routers having a maximum cost improvement for the RF interconnect shortcut such that the RF interconnect shortcut is established from the first RF-enabled router of the selected pair of RF-enabled routers to the second RF-enabled router of the selected pair of RF-enabled routers.

26. The integrated circuit of claim 12 wherein for each RF interconnect shortcut of the at least one RF interconnect shortcut, selection of the RF interconnect shortcut is performed for a particular application of the integrated circuit by:
  for each pair of RF-enabled routers, calculating a cost for communication between the pair of RF-enabled routers for the particular application; and
  selecting a pair of RF-enabled routers having a maximum cost for the RF interconnect shortcut such that the RF interconnect shortcut is established from a first RF-enabled router of the selected pair of RF-enabled routers to a second RF-enabled router of the selected pair of RF-enabled routers.

27. The integrated circuit of claim 12 wherein for each RF interconnect shortcut of the at least one RF interconnect shortcut, selection of the RF interconnect shortcut is performed for a particular application of the integrated circuit by:
  for each pair of RF-enabled routers, calculating a cost for the pair of RF-enabled routers based on an inter-router communication frequency profile defining an inter-router communication frequency between each pair of routers in the plurality of routers for the particular application; and
  selecting a pair of RF-enabled routers having a maximum cost for the RF interconnect shortcut such that the RF interconnect shortcut is established from a first RF-enabled router of the selected pair of RF-enabled routers to a second RF-enabled router of the selected pair of RF-enabled routers.

28. The integrated circuit of claim 12 wherein for an RF interconnect shortcut of the at least one RF interconnect shortcut, selection of the RF interconnect shortcut is performed for a particular application of the integrated circuit by:
  for each region pair of a plurality of regions of the integrated circuit, calculating a total cost for the region pair based on an inter-router communication frequency profile defining an inter-router communication frequency between each pair of routers in the plurality of routers for the particular application;
  select a region pair having a maximum cost; and
  selecting a pair of RF-enabled routers for the RF interconnect shortcut that includes a first RF-enabled router located within a first region of the selected region pair and a second RF-enabled router located within a second region of the selected region pair such that the RF interconnect shortcut is established from the first RF-enabled router in the first region to the second RF-enabled router in the second region.

29. The integrated circuit of claim 28 wherein the first RF-enabled router is an RF-enabled router located within the first region that has not already been selected as a source for another RF interconnect shortcut, and the second RF-enabled router is an RF-enabled router located within the second region that has not already been selected as a destination for another RF interconnect shortcut.

30. A method of selecting radio frequency (RF) interconnect shortcuts for an integrated circuit comprising a transmission line and a plurality of routers connected via wire line buses to form a Network on Chip (NoC) for the integrated circuit, at least two routers of the plurality of routers being RF-enabled routers, each RF-enabled router being associated with at least one of an RF transmitter and an RF receiver connected to the transmission line, comprising:
  calculating a total cost in terms of communication overhead for a current topology of the NoC with respect to interconnections of the plurality of routers and any previously selected RF interconnect shortcuts;
  for each pair of RF-enabled routers:
    calculating a total cost in terms of communication overhead for a modified topology of the NoC formed by the current topology of the NoC plus an RF-interconnect shortcut from a first router of the pair of RF-enabled routers to a second router of the pair of RF-enabled routers; and
    calculating a cost improvement based on a difference between the total cost for the modified topology of the NoC and the total cost for the current topology of the NoC; and
  selecting a pair of RF-enabled routers having a maximum cost improvement for an RF interconnect shortcut such that the RF interconnect shortcut is established from the first RF-enabled router of the selected pair of RF-enabled routers to the second RF-enabled router of the selected pair of RF-enabled routers via the transmission line.

31. A method of selecting radio frequency (RF) interconnect shortcuts for an integrated circuit comprising a transmission line and a plurality of routers connected via wire line buses to form a Network on Chip (NoC) for the integrated circuit, at least two routers of the plurality of routers being RF-enabled routers, each RF-enabled router being associated with at least one of an RF transmitter and an RF receiver connected to the transmission line, comprising:
  for each pair of RF-enabled routers, calculating a cost in terms of communication overhead for the pair of RF-enabled routers in a current topology of the NoC with respect to interconnections of the plurality of routers and any previously selected RF interconnect shortcuts; and
  selecting a pair of RF-enabled routers having a maximum cost for an RF interconnect shortcut such that the RF interconnect shortcut is established from a first RF-enabled router of the selected pair of RF-enabled routers to a second RF-enabled router of the selected pair of RF-enabled routers.

32. A method of selecting radio frequency (RF) interconnect shortcuts for an integrated circuit for a particular application, the integrated circuit comprising a transmission line and a plurality of routers connected via wire line buses to form a Network on Chip (NoC) for the integrated circuit, at least two routers of the plurality of routers being RF-enabled routers, each RF-enabled router being associated with at least one of an RF transmitter and an RF receiver connected to the transmission line, comprising:
  calculating a total cost for communication in a current topology of the NoC for the particular application;
  for each pair of RF-enabled routers:
    calculating a total cost for communication in a modified topology of the NoC formed by the current topology of the NoC plus an RF-interconnect shortcut from a first RF-enabled router of the pair of RF-enabled routers to a second RF-enabled router of the pair of RF-enabled routers for the particular application; and
    calculating a cost improvement based on a difference between the total cost for the modified topology of the NoC and the total cost for the current topology of the NoC; and
  selecting a pair of RF-enabled routers having a maximum cost improvement for an RF interconnect shortcut such that the RF interconnect shortcut is established from the first RF-enabled router of the selected pair of RF-enabled routers to the second RF-enabled router of the selected pair of RF-enabled routers.

33. A method of selecting radio frequency (RF) interconnect shortcuts for an integrated circuit for a particular application, the integrated circuit comprising a transmission line and a plurality of routers connected via wire line buses to form a Network on Chip (NoC) for the integrated circuit, at least two routers of the plurality of routers being RF-enabled routers, each RF-enabled router being associated with at least one of an RF transmitter and an RF receiver connected to the transmission line, comprising:

for each pair of RF-enabled routers, calculating a cost for communication between the pair of RF-enabled routers for the particular application; and selecting a pair of RF-enabled routers having a maximum cost for an RF interconnect shortcut such that the RF interconnect shortcut is established from a first RF-enabled router of the selected pair of RF-enabled routers to a second RF-enabled router of the selected pair of RF-enabled routers.

34. A method of selecting radio frequency (RF) interconnect shortcuts for an integrated circuit for a particular application, the integrated circuit comprising a transmission line and a plurality of routers connected via wire line buses to form a Network on Chip (NoC) for the integrated circuit, at least two routers of the plurality of routers being RF-enabled routers, each RF-enabled router being associated with at least one of an RF transmitter and an RF receiver connected to the transmission line, comprising:

for each region pair of a plurality of regions of the integrated circuit, calculating a total cost for the region pair based on an inter-router communication frequency profile defining an inter-router communication frequency between each pair of routers in the plurality of routers for the particular application;

select a region pair having a maximum cost; and selecting a pair of RF-enabled routers for an RF interconnect shortcut that includes a first RF-enabled router located within a first region of the selected region pair and a second RF-enabled router located within a second region of the selected region pair such that the RF interconnect shortcut is established from the first RF-enabled router in the first region to the second RF-enabled router in the second region.

\* \* \* \* \*